US011454506B2

(12) United States Patent
Kahn et al.

(10) Patent No.: US 11,454,506 B2
(45) Date of Patent: Sep. 27, 2022

(54) IDENTIFYING AND COMMUNICATING ROUTES USING GRAPH NETWORKS

(71) Applicant: Accenture Global Solutions Limited, Dublin (IE)

(72) Inventors: Laura Hill Kahn, Alexandria, VA (US); Viveca Maria Pavon-Harr, Arlington, VA (US); Onur Savas, Potomac, MD (US); Benjamin Ortiz, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 312 days.

(21) Appl. No.: 16/872,078

(22) Filed: May 11, 2020

(65) Prior Publication Data

US 2021/0095982 A1 Apr. 1, 2021

Related U.S. Application Data

(60) Provisional application No. 62/908,420, filed on Sep. 30, 2019.

(51) Int. Cl.
*H04W 4/00* (2018.01)
*G01C 21/34* (2006.01)
(Continued)

(52) U.S. Cl.
CPC ....... *G01C 21/3461* (2013.01); *G01C 21/362* (2013.01); *G06F 16/29* (2019.01);
(Continued)

(58) Field of Classification Search
CPC ....... H04W 64/00; H04W 4/02; H04W 4/029; H04W 4/021; H04W 4/90; G01S 5/14; H04M 3/42348
See application file for complete search history.

(56) References Cited

U.S. PATENT DOCUMENTS 9,683,856 B2   6/2017  Iyer et al.
2013/0060729 A1 3/2013 Massey
(Continued)

OTHER PUBLICATIONS

Caribbean News. Dominica's Resilience after Hurricane Maria. https://www.caribbeannewsnow.com/2019/06/10/dominicas-resilience-after-hurricane-maria. Accessed Jul. 17, 2019.
(Continued)

*Primary Examiner* — Omoniyi Obayanju
(74) *Attorney, Agent, or Firm* — Harrity & Harrity, LLP

(57) ABSTRACT

A device may receive geospatial data identifying roads and buildings in a geographical region, and may transform the geospatial data into geospatial objects for the roads and the buildings. The device may correlate shelter data with the geospatial objects to generate correlated data that includes the geospatial objects and the shelter data. The device may process the correlated data to add bounding boxes around the geospatial objects corresponding to the shelters to generate modified correlated data. The device may correlate road weight and type data with the modified correlated data to generate final geospatial data, and may convert the final geospatial data into a directed graph. The device may receive event data identifying an event and inaccessible roads caused by the event, may update the directed graph based on the event data to generate an updated directed graph, and may provide a representation of the updated directed graph for display.

20 Claims, 22 Drawing Sheets

(51) Int. Cl.
  G01C 21/36 (2006.01)
  H04W 4/021 (2018.01)
  G06N 20/00 (2019.01)
  H04W 4/90 (2018.01)
  G06F 16/29 (2019.01)
  H04W 4/024 (2018.01)

(52) U.S. Cl.
  CPC ............ *G06N 20/00* (2019.01); *H04W 4/021* (2013.01); *H04W 4/024* (2018.02); *H04W 4/90* (2018.02)

(56) References Cited

U.S. PATENT DOCUMENTS

2014/0306820 A1* 10/2014 Araiz-Boys .......... G08B 27/006 340/539.2
2016/0371966 A1* 12/2016 P ........................ G01C 21/3415

OTHER PUBLICATIONS

Jetten, V.G.; Alkema, D.; Van Westen, C.J., Brussel, M.J.G. 2014. Development of the Caribbean Handbook on Disaster Risk Information Management: Extended Abstract. Abstract from Analysis and Management of Changing Risks for Natural Hazards.

Shekhar, S.; Yang, K.; Gunturi, V.M.V.; Manikonda, L.; Oliver, D.; Zhou, X.; George, B.; Kim, S.; Wolff, J.M.R; Lu, Q. 2012. Experiences with Evacuation Route Planning Algorithms. International Journal of Geographical Information Science 26(12): 2253-2265.

Ahmadzai, Farhad, "Assessment and Modeling of Urban Road Networks using Integrated Graph of Natural Road Network (a GIS-Based Approach)," Journal of Urban Development, vol. 8, Apr. 2019, pp. 109-125.

Avvenuti, Mark, "CrisMap: a Big Data Crisis Mapping System Based on Damage Detection and Geoparsing," Information Systems Frontiers, 20, 2018, pp. 993-1011.

Campos, Vania, "A Method for Evacuation Route Planning in Disaster Situations," Procedia—Social and Behavioral Sciences, vol. 54, Oct. 4, 2012, pp. 503-512.

Csardi, Gabor, The Igraph Software Package for Complex Network Research, International Journal of Complex Systems, 2006, p. 1695.

Fellows, Ian, "OpenStreetMap: Access to Open Street Map Raster Images," 2018.

Gasson, Susan, "Human-Centered vs. User-Centered Approaches to Information System Design," The Journal of Information Technology Theory and Application., 2003, (5):Feb. 29, 1946.

Hilljegerdes, Martin, "Evaluating the effects of consecutive hurricane hits on evacuation patterns in Dominica," In Proceedings of the 16th International Conference on Information Systems for Crisis Response and Management, 2019.

Kim, Sanghao, "Evacuation route planning: Scalable Heuristics," In 15th International Symposium on Advances in Geographic Information Systems, Nov. 2007, Article 20, pp. 1-8.

Padgham, Mark, "Dodgr: An R package for network flow aggregation," In Transportation Findings, Feb. 14, 2019.

Van De Walle, Bartel, "Decision support for emergency situations," In Information Systems and e-Business Management, Mar. 26, 2008, vol. 6, pp. 295-316.

Shultz, James, "Risks, Health Consequences, and Response Challenges for Small-Island-Based Populations: Observations From the 2017 Atlantic Hurricane Season," In Disaster Medicine and Public Health Preparedness, Feb. 2019, vol. 13, pp. 5-17.

\* cited by examiner

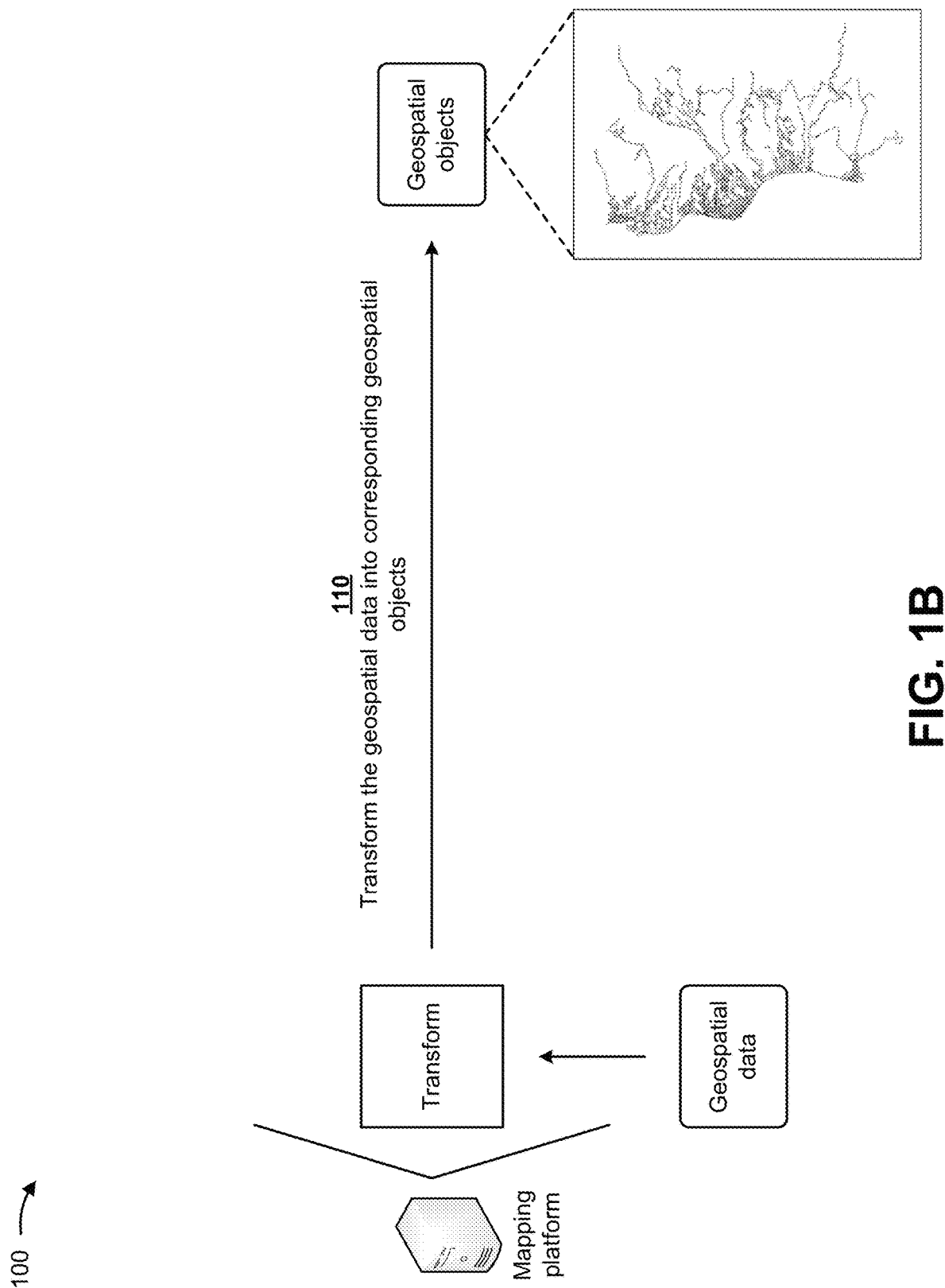

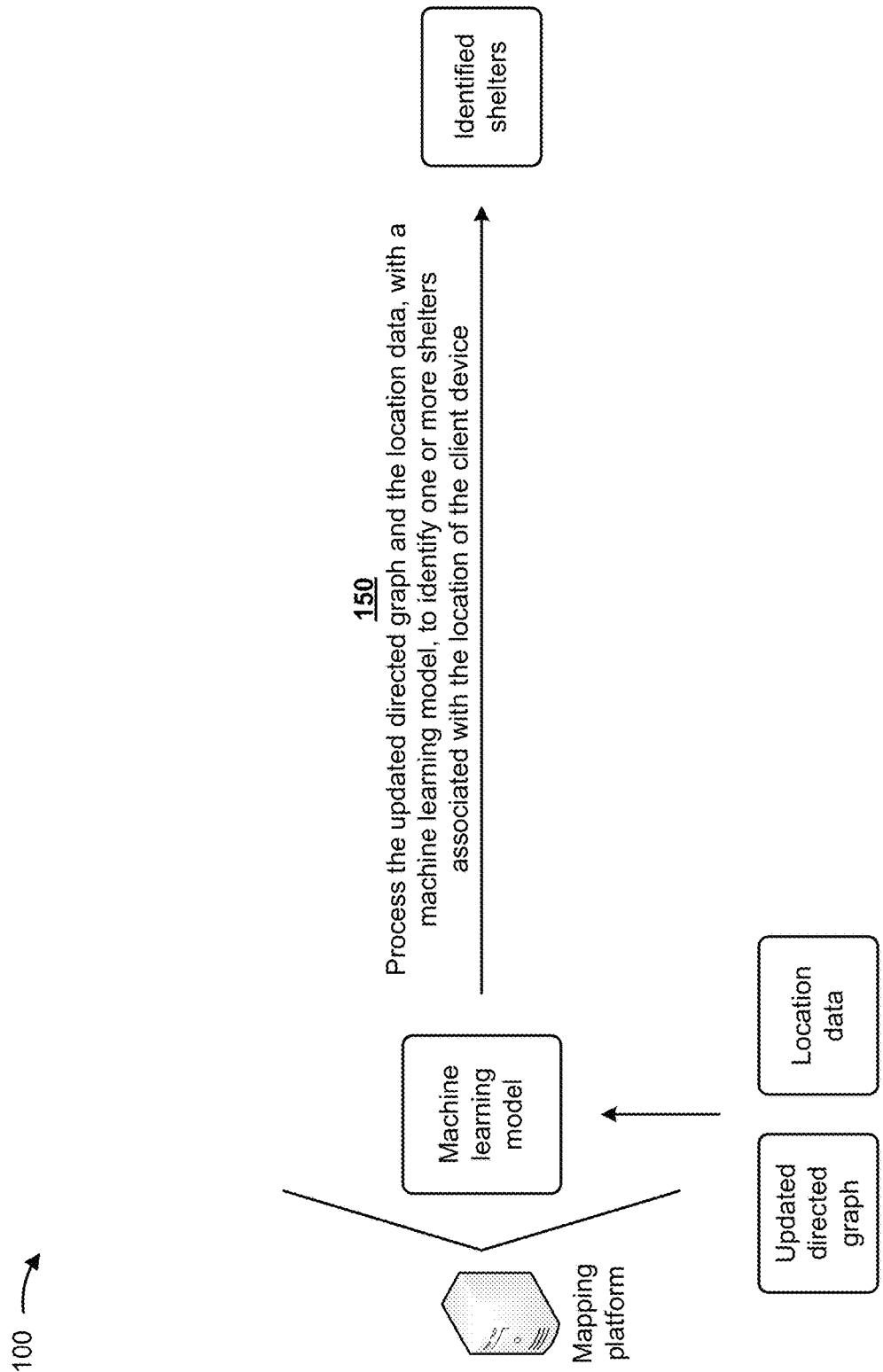

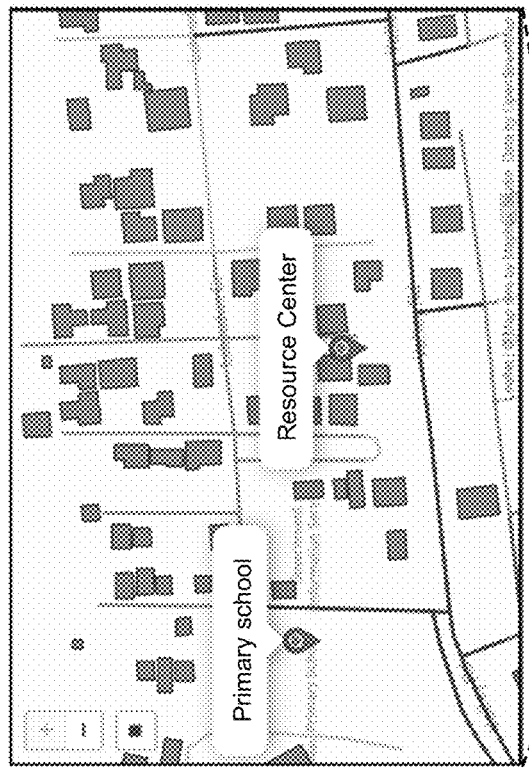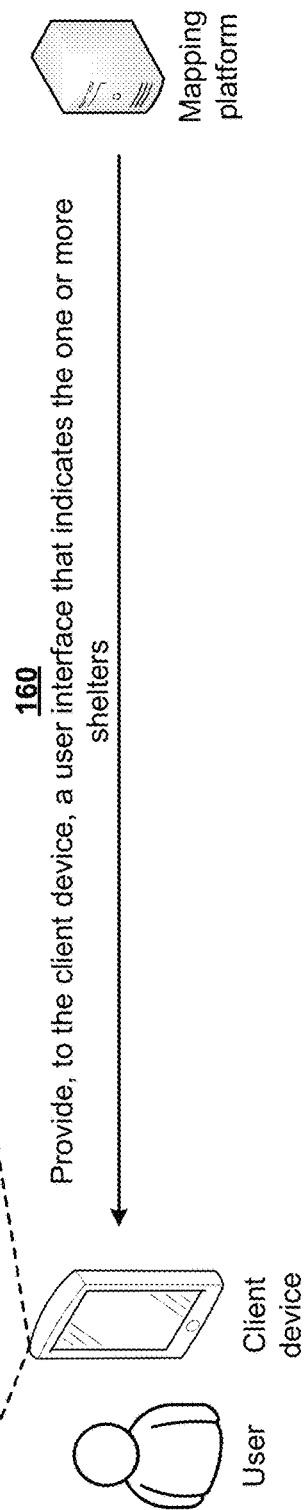
FIG. 1L

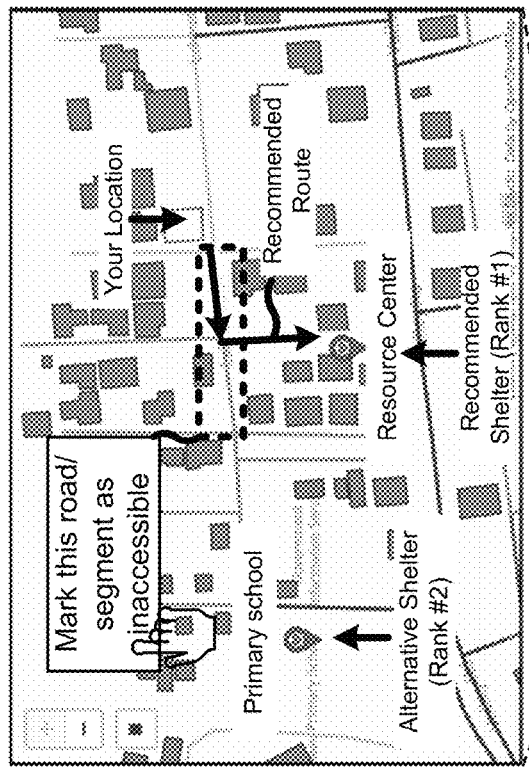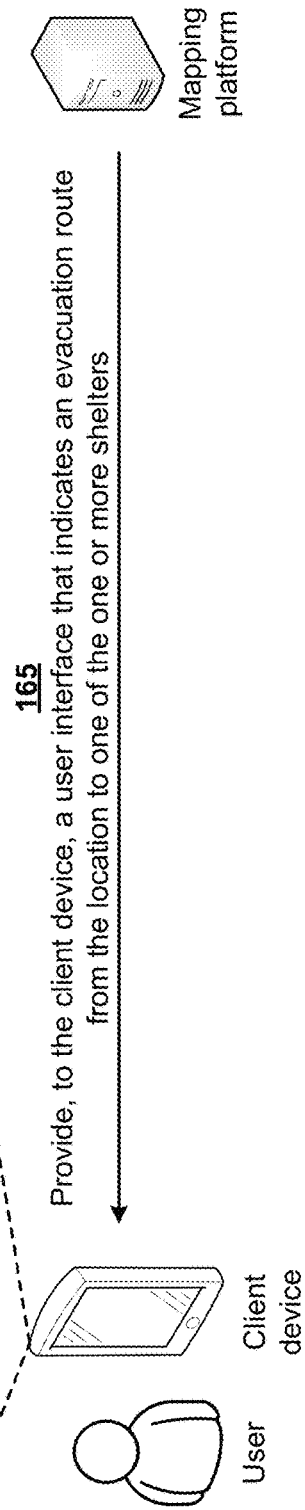
FIG. 1M

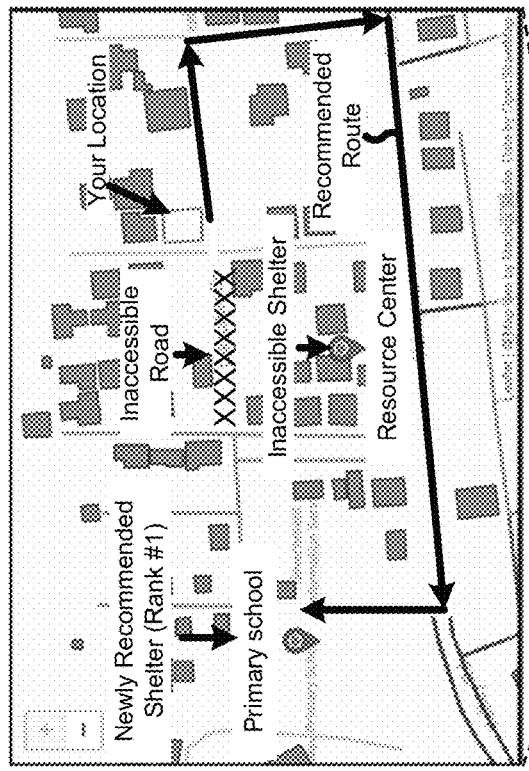
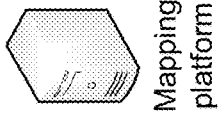
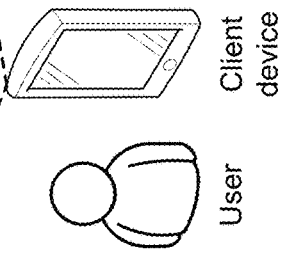
170
Provide, to the client device, a user interface that indicates alternative evacuation route from the location to one of the one or more shelters
FIG. 1N

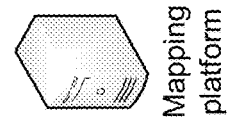
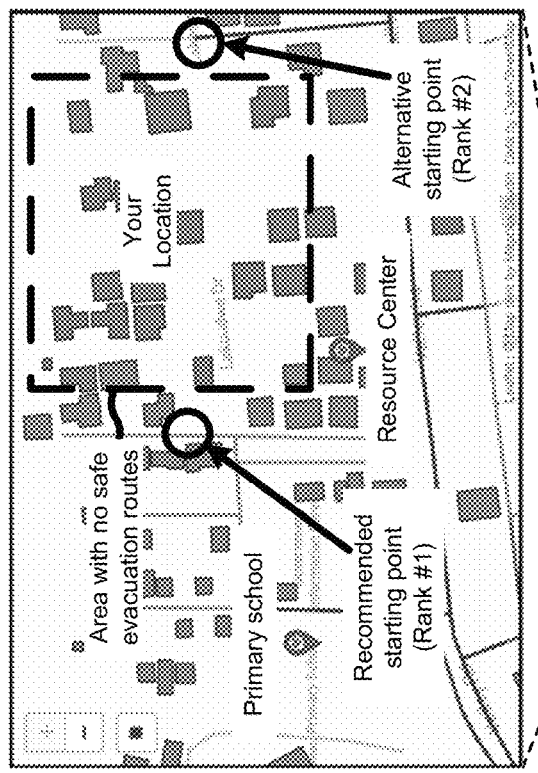
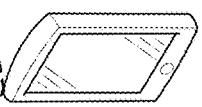
175
Provide, to the client device, a user interface that indicates that there are no safe evacuation routes from the location to the one or more shelters
FIG. 10

IDENTIFYING AND COMMUNICATING ROUTES USING GRAPH NETWORKS

CROSS-REFERENCE TO RELATED APPLICATION

This patent application claims priority to U.S. Provisional Patent Application No. 62/908,420, filed on Sep. 30, 2019, and entitled "EVACUATION MANAGEMENT PLATFORM." The disclosure of the prior application is considered part of and is incorporated by reference into this patent application.

BACKGROUND

Prior to, during, or after a natural disaster or another emergency event has occurred, there may be a movement of people and/or things (e.g., supplies) from an original location to a different location. However, the availability of routes before, during, and after emergency events may be unpredictable. For example, isolated areas, such as remote islands, remote rural locations, and/or the like, are at risk for unpredictable damage to existing road networks for evacuations before natural disasters occur and/or for recovery efforts after the event has concluded. Conditions of roadways and other types of evacuation routes may quickly change during a natural disaster. Current humanitarian logistics efforts include decision makers visually inspecting last known ad-hoc road network maps to decide where to send people prior to, during, and after a natural disaster or other emergency event.

SUMMARY

According to some implementations, a method may include receiving, by a device and from one or more data sources, geospatial data identifying at least two of roads, buildings, or other objects of interest in a geographical region; transforming, by the device, the geospatial data identifying the at least two of roads, buildings, or other objects of interest into corresponding geospatial objects; correlating, by the device, destination data, that identifies destinations in the geographical region, with the geospatial objects to generate correlated data that includes the geospatial objects and the destination data; processing, by the device, the correlated data to add bounding boxes around the geospatial objects corresponding to the destinations in the geographical region, to generate modified correlated data; correlating, by the device, road weight and type data with the modified correlated data to generate final geospatial data for the geographical region; converting, by the device, the final geospatial data into a directed graph for the geographical region; receiving, by the device and from one or more data sources, event data identifying an event and inaccessible roads, caused by the event, in the geographical region; updating, by the device, the directed graph for the geographical region based on the event data, to generate an updated directed graph; and providing, by the device, a representation of the updated directed graph for display.

According to some implementations, a device may include one or more memories and one or more processors. In some implementations, the one or more processors are communicatively coupled to the one or more memories. The one or more processors may be configured to: receive, from one or more data sources, geospatial data identifying roads and buildings in a geographical region; transform the geospatial data identifying the roads and the buildings into geospatial objects that correspond to the roads and the buildings; correlate shelter data that identifies shelters in the geographical region with the geospatial objects to generate correlated data that includes the geospatial objects and the shelter data; process the correlated data to add bounding boxes around the geospatial objects corresponding to the shelters in the geographical region, to generate modified correlated data; correlate road weight and type data with the modified correlated data to generate final geospatial data for the geographical region; convert the final geospatial data into a directed graph for the geographical region; receive, from one or more data sources, event data identifying an event and inaccessibility of roads, caused by the event, in the geographical region; update the directed graph for the geographical region based on the event data and to generate an updated directed graph; receive, from a client device of a user, location data identifying a location of the client device in the geographical region; process the updated directed graph and the location data, with a machine learning model, to identify one or more shelters associated with the location of the client device; and perform one or more actions based on identifying the one or more shelters.

According to some implementations, a non-transitory computer-readable medium may store one or more instructions. The one or more instructions, when executed by one or more processors of a device, may cause the one or more processors to: transform geospatial data, identifying roads and buildings in a geographical region, into geospatial objects that correspond to the roads and the buildings; correlate shelter data that identifies shelters in the geographical region and road weight and type data with the geospatial objects to generate final geospatial data for the geographical region; convert the final geospatial data into a directed graph for the geographical region; receive event data identifying an event and inaccessible roads, caused by the event, in the geographical region; update the directed graph for the geographical region based on the event data and to generate an updated directed graph; receive, from a client device of a user, location data identifying a location of the client device in a geographical region; process the updated directed graph and the location data, with a machine learning model, to identify one or more shelters associated with the location of the client device; and perform one or more actions based on identifying the one or more shelters.

DETAILED DESCRIPTION

The following detailed description of example implementations refers to the accompanying drawings. The same reference numbers in different drawings may identify the same or similar elements.

Prior to or during a natural disaster or another event that requires movement of people from one place to another, effective communication of information relating to evacuation routes may be difficult. Some implementations described herein provide a system to determine available routes between locations and to update available routes as information is input to the system. Further, some implementations described herein provide an intuitive user interface that can be used to guide people along available routes. Some implementations can determine or generate technical parameters for a user interface and providing those technical parameters to enable the user interface to be rendered for display on a device.

Using such a mapping system, a user can select a best route to shelter in a city road network during an evacuation, can select an alternative route if an original evacuation route becomes damaged during a disaster, or can determine that there are no evacuation routes during a recovery phase of a natural disaster or emergency event. Some implementations described herein can be used by policy makers and/or decision makers to plan and/or communicate evacuation scenarios to improve resilience to natural disasters even when evacuation routes change.

As described in more detail herein, mapping system may calculate a route according to one or more models (e.g., machine learning models), and may provide information for display in an interactive manner to permit a user to make decisions based on the information. In some implementations, heterogeneous data layers are transformed into visual display features that quickly communicate evacuation route information to enable a user can make a more informed decision, relative to previous techniques, about which route to take prior to and following a natural hazard. In this way, the mapping platform, as described herein, may improve safety, reduce consumption of resources (e.g., including network resources that would be expending by users attempting to obtain route information), and preserve human life.

Figure 1A:
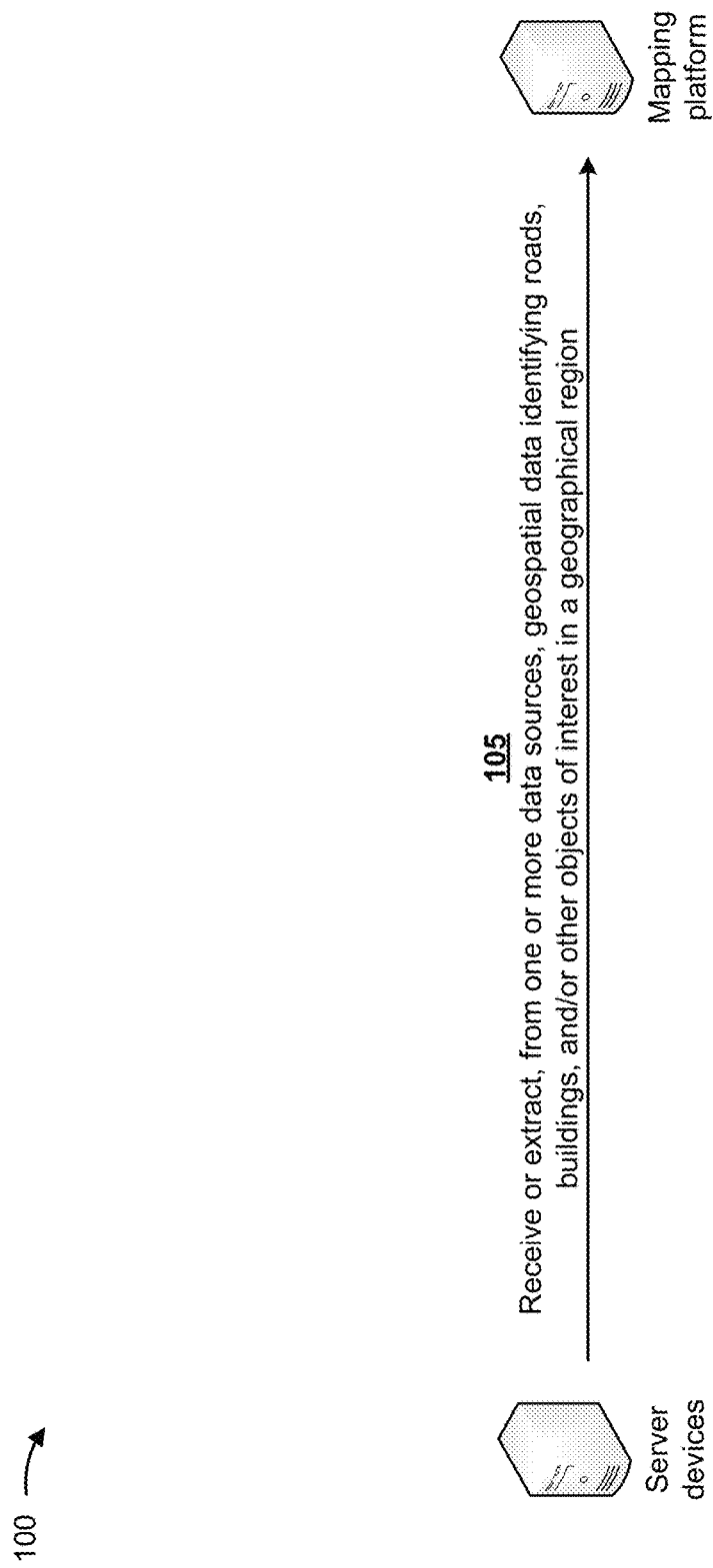
FIGS. 1A-1O are diagrams of one or more examples relating to mapping systems and user interfaces.

FIGS. 1A-1O are diagrams of one or more examples 100 relating to mapping systems and user interfaces. As shown in FIGS. 1A-1O, example implementation 100 includes one or more server devices, a mapping platform, and a client device.

As shown in FIG. 1A, and by reference number 105, the mapping platform may receive or extract geospatial data (sometimes referred to as geodata). The geospatial data may include data that identifies roads, buildings, and/or other objects of interest (e.g., locations of interest, geographical features such as parks or lakes, and/or the like) in a geographical region. The mapping platform may receive or extract the information from one or more data sources, shown as server devices. For example, the mapping platform may obtain the information from a server and/or a database that stores geospatial data, map data, and/or the like. In some implementations, the geospatial data may be encoded to include geographic coordinates (e.g., latitude, longitude, elevation, and/or the like) that are associated with places, such as addresses, names of places, landmarks, and/or the like. Alternatively, the mapping platform may geocode the geospatial data, as described below.

As shown in FIG. 1B, and by reference number 110, the mapping platform may transform the geospatial data into geospatial objects that correspond to the roads, buildings, and/or other objects of interest. For example, the mapping platform may encode the geospatial data to create a geospatial object having an identifier and a set of geographic coordinates. A geospatial object corresponding to a building (sometimes referred to as a building object) may include, for example, an identifier associated with the building (e.g., a name, an address, a label, and/or the like) and a set of geographic coordinates associated with the building. The geographic coordinates may identify one or more locations associated with the building, such as location where the building exists, a location that represents a center of the building, a set of coordinates that represent a perimeter of the building, and/or the like. In some implementations, a building object may be identified using a building object identifier associated with the building object.

A geospatial object corresponding to a road (sometimes referred to as a road object) may include, for example, an identifier associated with the road (e.g., a name, a label, and/or the like) and a set of geographic coordinates associated with the road. The geographic coordinates may identify one or more locations associated with the building, such as a set of locations along the road. The road object may include geographic coordinates indicating one end of the road, geographic coordinates indicating another end of the road, and/or geographic coordinates indicting one or more points along the road. In some implementations, a road object may be identified using a road object identifier associated with the road object. In some implementations, a road object may include an indication (e.g., a flag, a bit, and/or the like) that indicates whether the road is accessible or inaccessible. The mapping platform may update and/or modify this indication based on dynamic feedback and/or data from client devices. By creating geospatial objects, the mapping platform enables the geospatial data to be output on and/or represented on a user interface, as described in more detail below.

Figure 1C:
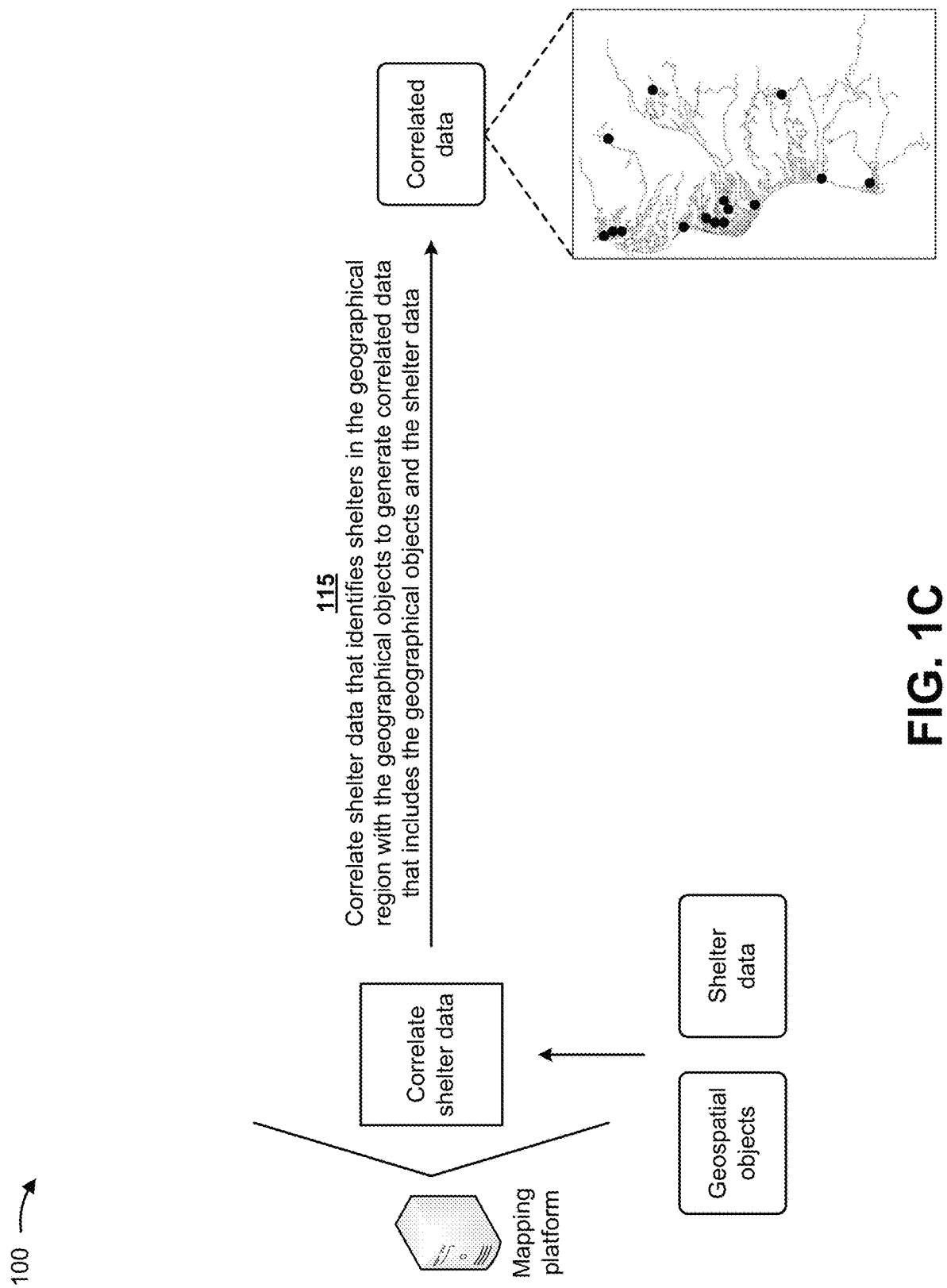

As shown in FIG. 1C, and by reference number 115, the mapping platform may correlate destination data (e.g., shelter data) with the geospatial objects to generate correlated data that includes the geospatial objects and the destination data. The destination data may identify destinations in the geographical region, which may include a shelter (e.g., a building, a particular type of building, a building labeled as a shelter, and/or the like) or another object of interest. Examples are described herein in connection with shelter data for shelters, but other examples may use destination data other than shelter data for other objects of interest (e.g., other destinations) other than shelters. The shelter data may be geocoded as a shelter object, which may include, for example, an identifier associated with the shelter (e.g., a name, an address, a label, and/or the like) and a set of geographic coordinates associated with the shelter, which may be the same as or similar to the geographic coordinates described above in connection with the building object. Additionally, or alternatively, the shelter data may identify a person associated with a shelter (e.g., a person associated with managing the shelter in an emergency event), contact information for the person (e.g., a name, a phone number, an email address, and/or the like), a type of shelter (e.g., a church, a school, a stadium, and/or the like), and/or the like. In some implementations, a shelter object may be identified using a shelter object identifier associated with the shelter object.

Figure 1D:
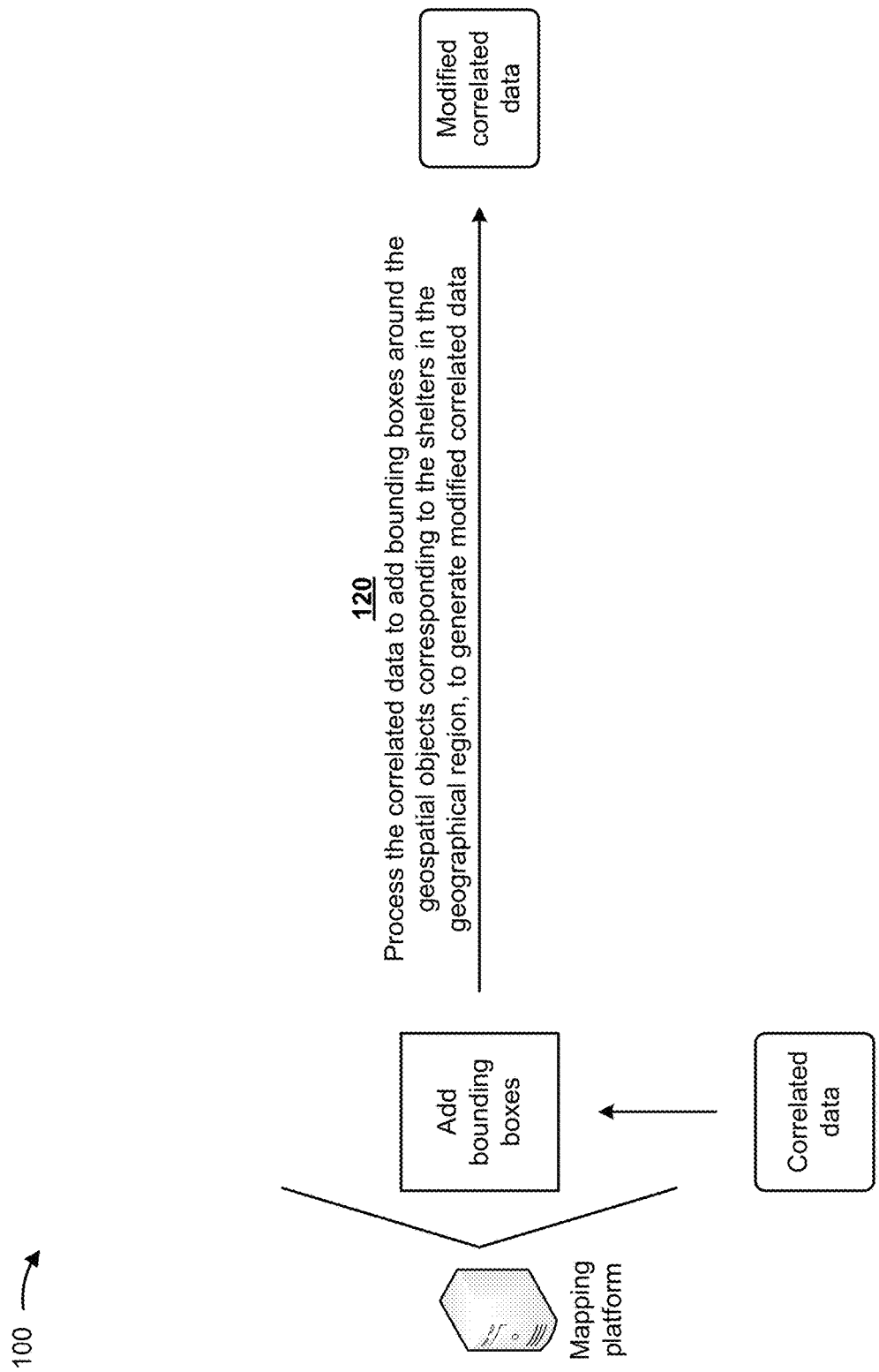

As shown in FIG. 1D, and by reference number 120, the mapping platform may process the correlated data (e.g., the building objects, the road objects, and/or the shelter objects) to add bounding boxes around the geospatial objects corresponding to the shelters and/or the buildings in the geographical region. A result of this processing may be referred to as modified correlated data. A bounding box may be defined by an area between two latitudinal lines and two longitudinal lines. In some implementations, a shape other than a box may be used (e.g., a bounding polygon). For example, a bounding box or a bounding polygon may define a perimeter of a building and/or a shelter.

Figure 1E:
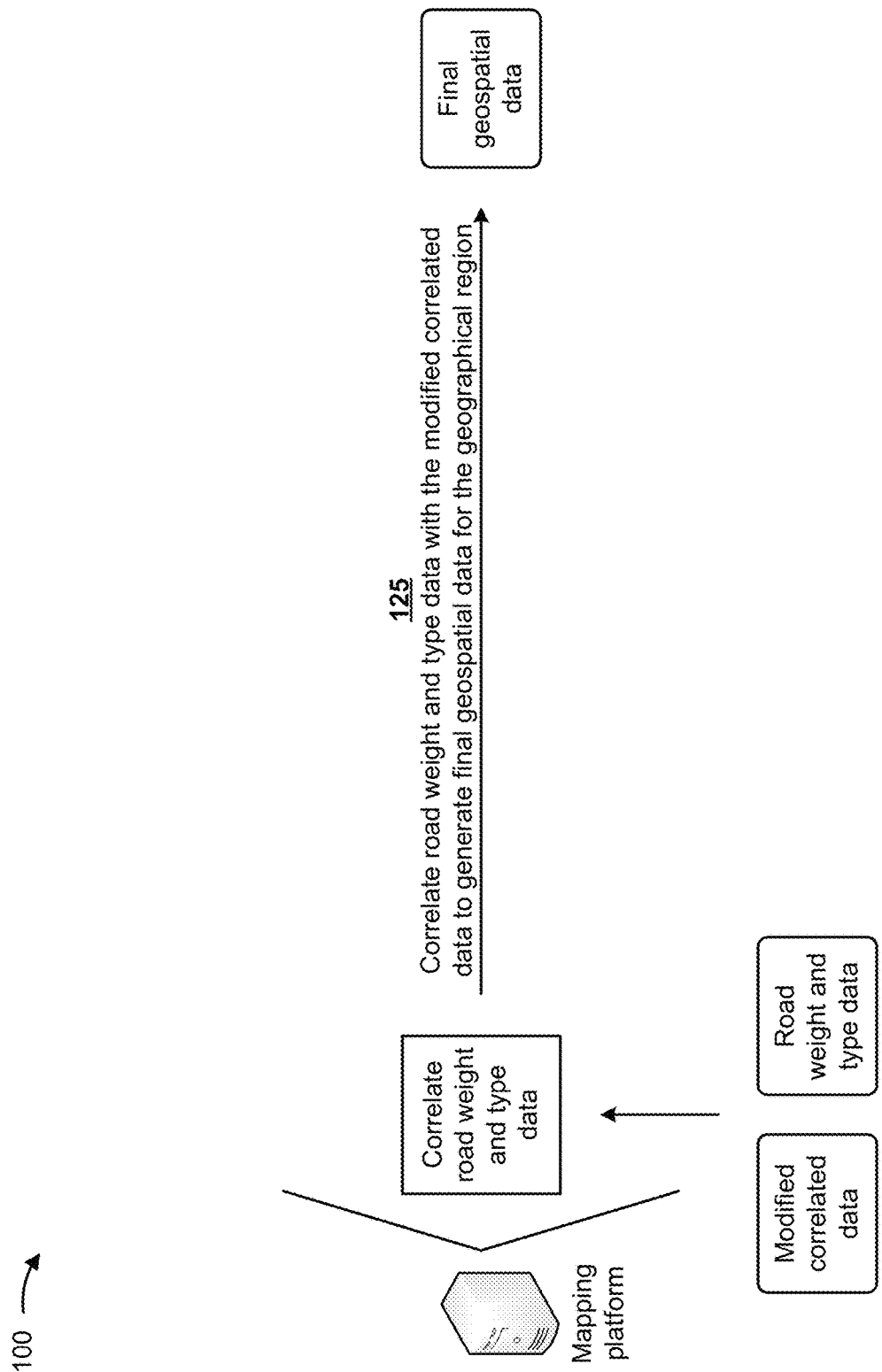

As shown in FIG. 1E, and by reference number 125, the mapping platform may correlate road weight data and road type data with the modified correlated data (e.g., the road objects, the shelter objects with bounding polygons, the building objects with bounding polygons, and/or the like). A result of this correlating may be referred to as final geospatial data for the geographical region. The mapping platform may determine a road weight for a road. In some implementations, the mapping platform determines the road weight based on a betweenness centrality calculated for the road or another measure of network strength calculated for the road. Betweenness centrality may refer to a measure of the influence of a road on the flow of traffic (e.g., vehicles) between a pair of points (e.g., a pair of roads, a pair of buildings, a pair of shelters, a road and a building, a road and a shelter, a building and a shelter, and/or the like), with an assumption that traffic primarily flows over the shortest paths between pairs of points. For example, betweenness centrality may be a measure of centrality in a graph network (e.g., a connected graph, a directed graph, and/or the like) based on shortest paths, or a measure of how important a node (e.g., a road) is to the shortest paths through the network of roads, buildings, and shelters in the geographical region. Additionally, or alternatively, the mapping platform may determine the road weight based on another factor associated with the road, such as a length of the road, a width of the road (e.g., a number of roads), a traffic volume associated with the road, and/or the like. A road type may refer to a categorization of a road, such as a primary road, a secondary road, a tertiary road, a highway, a service road, and/or the like. As used herein, a road may refer to an entire road or a segment of an entire road.

Figure 1F:
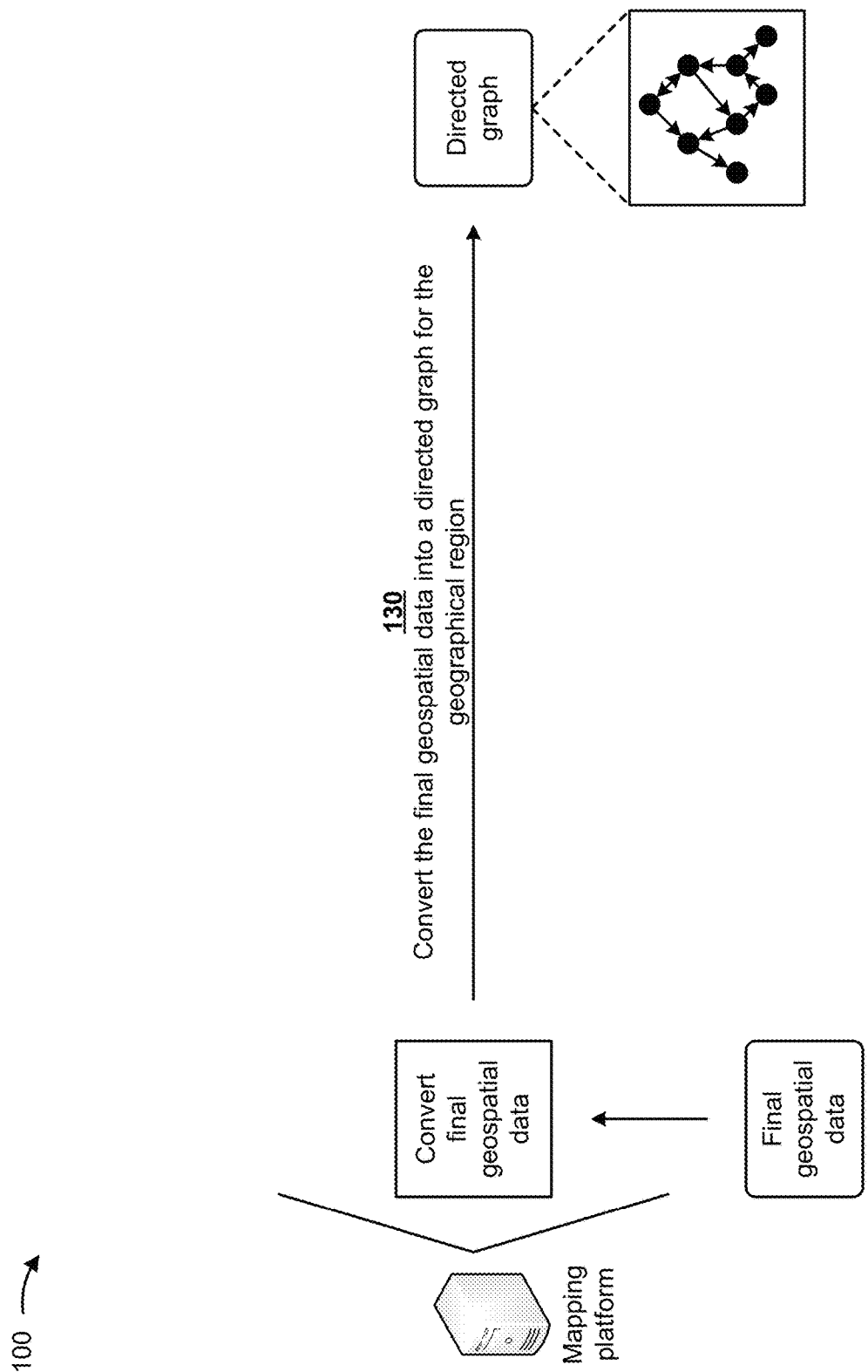

As shown in FIG. 1F, and by reference number 130, the mapping platform may convert the final geospatial data into a graph for the geographical region. As an example, the mapping platform may generate a directed graph from the final geospatial data. A directed graph (sometimes referred to as a digraph) is a graph that includes a set of vertices (or nodes) connected by edges, where the edges are associated with a direction (which may indicate a one-way connection or a two-way connection). The mapping platform may convert the final geospatial data into the directed graph by encoding roads as vertices in the directed graph, and/or by encoding connections between roads as edges in the directed graph. The directed graph may be used to generate information to be represented on a user interface, such as roads and connections between roads, as described in more detail below. In some implementations, the mapping platform may determine road weights, as described above, based on the directed graph. Additionally, or alternatively, the mapping platform may represent road weights in the directed graph by assigning weight values to vertices in the directed graph.

Figure 1G:
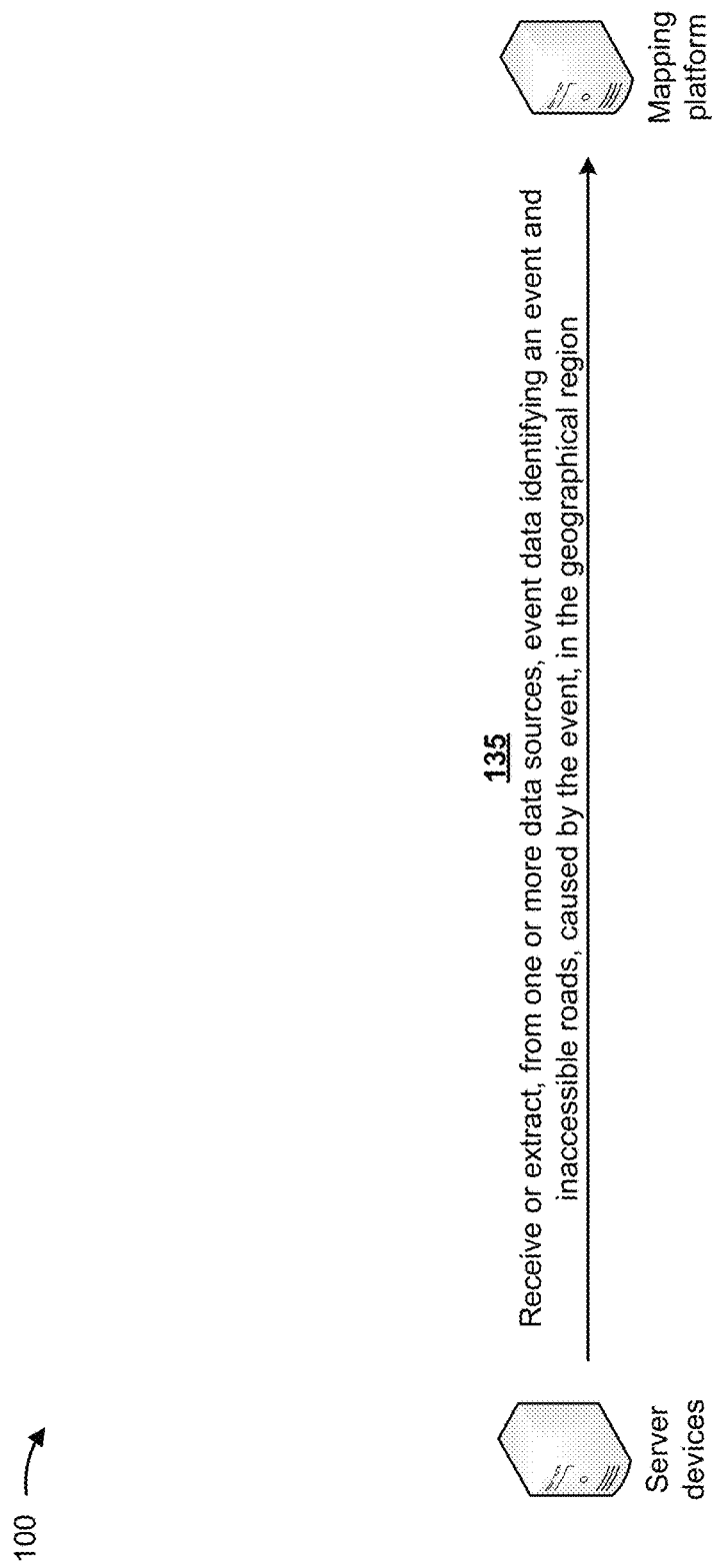

As shown in FIG. 1G, and by reference number 135, the mapping platform may receive or extract event data. The event data may identify an event and inaccessible roads, caused by the event, in the geographical region. The mapping platform may receive or extract the event data from one or more data sources, shown as server devices. For example, the mapping platform may obtain the event data from a server and/or a database that stores event data input by users (e.g., via client devices), that stores information that identifies inaccessible roads based on data input by users (e.g., via client devices), and/or the like. For example, an event such as a natural disaster, a parade, construction, a fallen tree, a road blockage, a pandemic, a military conflict, a terrorist act, civil unrest, and/or the like may result in an inaccessible road. A user may interact with a user interface of a client device to input information indicating that the road is inaccessible, as described in more detail below. The client device may provide this information to the mapping platform and/or to a server device in communication with the mapping platform. The mapping platform may use this information to update the directed graph, as described in more detail below.

Additionally, or alternatively, the mapping platform may obtain information by performing a web search for news articles, social media posts, and/or the like to identify inaccessible roads. For example, the mapping platform may perform natural language processing to identify text indicating that a road is inaccessible and may update the directed graph based on this information.

Figure 1H:
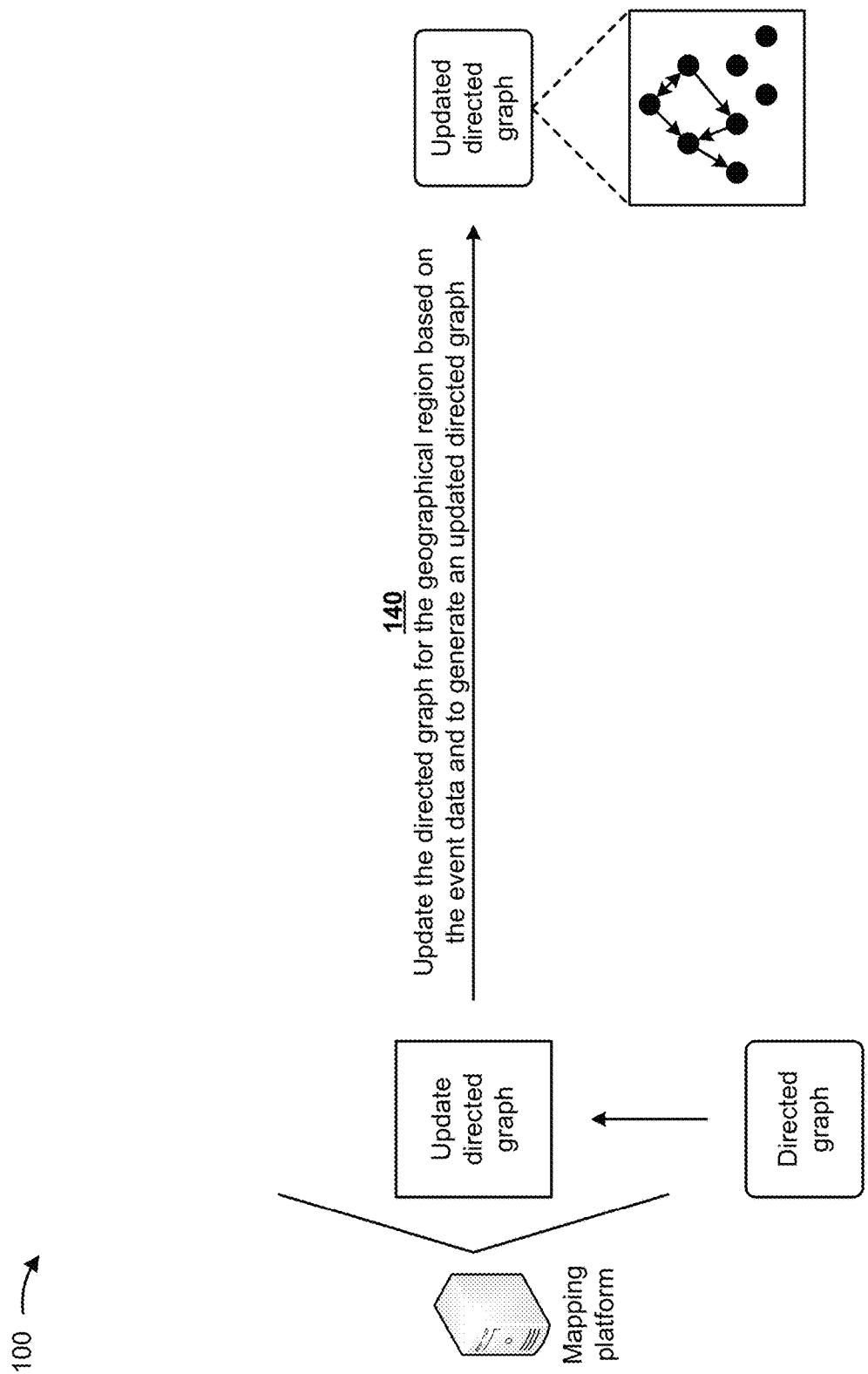

As shown in FIG. 1H, and by reference number 140, the mapping platform may update the directed graph for the geographical region based on the event data to generate an updated graph (e.g., a directed graph). For example, the mapping platform may remove, from the directed graph, one or more vertices that represent inaccessible roads. Additionally, or alternatively, the mapping platform may remove connections between an inaccessible road and other roads. In some implementations, the mapping platform may update road weights based on the updated directed graph. Additionally, or alternatively, the mapping platform may represent updated road weights in the updated directed graph by assigning updated weight values to vertices in the directed graph.

Figure 1I:
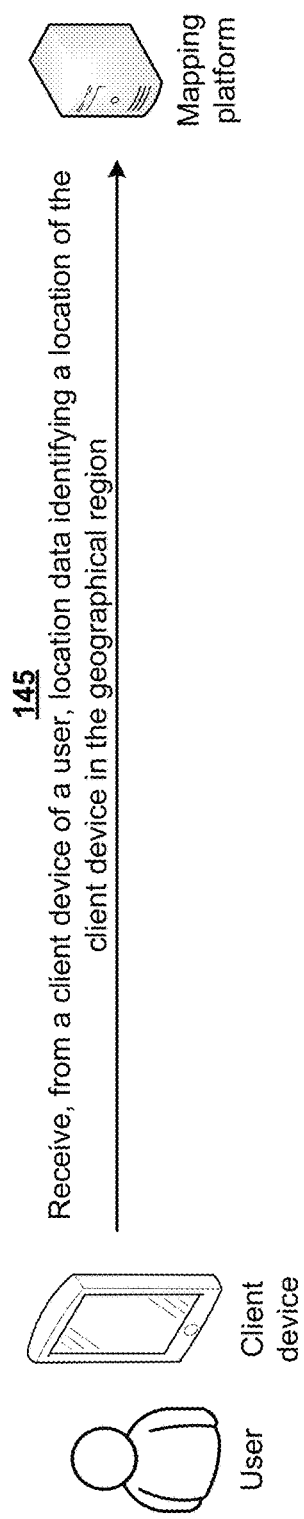

As shown in FIG. 1I, and by reference number 145, the mapping platform may receive location data identifying a location of a client device in the geographical region. As shown, the mapping platform may receive the location data from the client device. For example, the mapping platform may receive global positioning system (GPS) or similar data from the client device. In some implementations, the mapping platform may request the location data based on detecting occurrence of an event, such as a natural disaster. Additionally, or alternatively, the client device may detect the event (e.g., via reception of a message, such as a short message service (SMS) message, an emergency message, an Earthquake and Tsunami Warning System (ETWS) message, and/or the like), and may provide the location data to the mapping platform based on detecting the event. Additionally, or alternatively, the client device may provide the location data to the mapping platform based on detecting execution of a particular application on the client device (e.g., a mapping application, an emergency application, and/or the like).

As shown in FIG. 1J, and by reference number 150, the mapping platform may process the updated directed graph and the location data to identify one or more shelters associated with the location of the client device. In some implementations, the mapping platform may use a machine learning model to process the updated directed graph and the location data. The machine learning model may be trained on a set of observations that include shelter data, road data, location data, and/or the like, with a target variable of a recommended shelter to be indicated to the client device. Additional details regarding the machine learning model are described below in connection with FIG. 2 and FIG. 3.

Figure 1K:
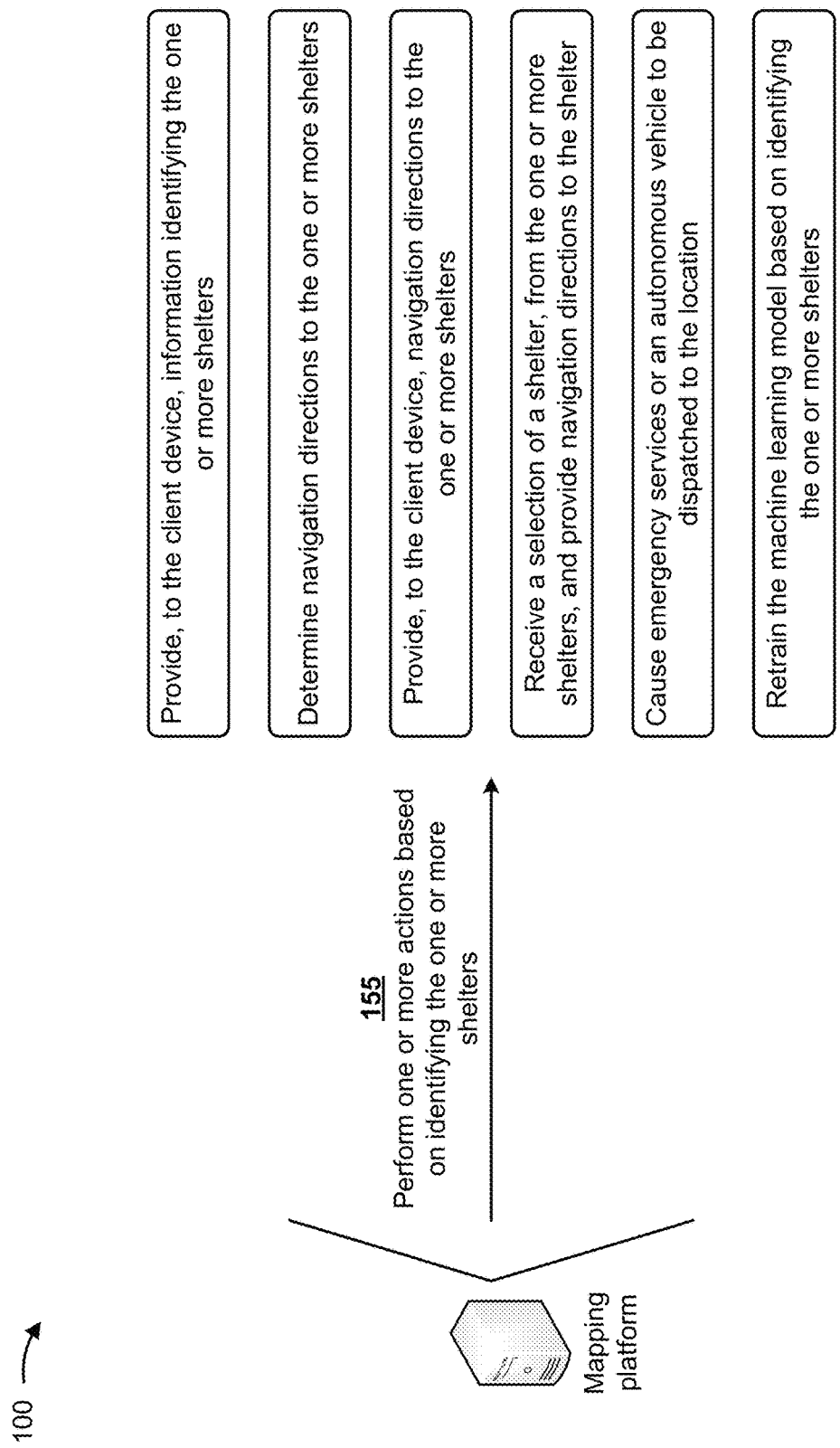

As shown in FIG. 1K, and by reference number 155, the mapping platform may perform one or more actions based on identifying the one or more shelters. For example, the mapping platform may provide, to the client device, information identifying the one or more shelters. This information may be provided for display on a user interface of the client device to indicate a shelter for a user of the client device. As another example, the mapping platform may determine navigation directions to the one or more shelters. Additionally, or alternatively, the mapping platform may receive a selection of a shelter of the one or more shelters (e.g., based on user input provided via the client device), and may determine and/or provide navigation directions to the selected shelter. The mapping platform may determine the navigation directions based on the directed graph, which may account for one or more inaccessible roads. In some implementations, the mapping platform may provide the navigation directions to the client device. The navigation directions may be provided for display on a user interface of the client device to indicate a route to a shelter.

As another example, the mapping platform may cause emergency services or an autonomous vehicle to be dispatched to the location. For example, the mapping platform may communicate with a system that notifies emergency services and/or an autonomous vehicle of the location of the client device and a shelter. The mapping platform may provide navigation directions to the emergency services and/or the autonomous vehicle, which may be used for navigation to the location of the client device. The user may be picked up and driven to the shelter, with navigation directions to the shelter being provided by the mapping platform to the emergency services vehicle and/or the autonomous vehicle.

As another example, the mapping platform may retrain the machine learning model based on identifying the one or more shelters. For example, the identified shelter and/or a shelter selected by a user may be input as a target variable as part of an observation that includes shelter data, road data, location data, and/or the like, as described in more detail below in connection with FIG. 2 and FIG. 3.

As shown in FIG. 1L, and by reference number 160, the mapping platform may provide, to the client device, a user interface that indicates the one or more shelters. For example, the mapping platform may provide display parameters to the client device, and the display parameters may define a user interface to be provided and/or rendered for display by the client device. In some implementations, the user interface may be and/or may include a representation of the directed graph. For example, the user interface may include a map with an indication of roads, buildings, and/or shelters. The information provided to the client device may include road objects, building objects, and/or shelter objects that permit the client device to display a map that includes representations of roads rendered from the road objects, building rendered from the building objects, and shelters rendered from the shelter objects. In some implementations, a road may be marked and/or represented on the user interface based on a road weight and/or a road type associated with the road. For example, roads with a road weight satisfying a threshold and/or of a first road type may be marked using a first color, roads with a road weight that do not satisfy the threshold and/or of a second road type may be marked using a second color, and so on. Any number of thresholds and/or road types may be used to mark roads differently to distinguish roads with different characteristics on the user interface.

In some implementations, the mapping platform may recommend one or more shelters for a user of the client device to seek out. For example, the mapping platform may indicate one or more recommended shelters and/or may rank shelters, and may provide information regarding the one or more recommended shelters and/or the ranked shelters to the client device for display on the client device. In some implementations, the mapping platform may only provide information (e.g., shelter objects) associated with recommended shelters to the client device, and may refrain from providing information for non-recommended shelters to the client device. Alternatively, the mapping platform may provide information for both recommended shelters and non-recommended shelters to the client device, and may provide an indication of whether a shelter is recommended or non-recommended. The client device may display representations of recommended and non-recommended shelters differently (e.g., using a different color, label, and/or the like). The mapping platform may determine a ranking for shelters and/or may identify recommended shelters using a machine learning algorithm, as described in more detail below in connection with FIG. 2 and FIG. 3. The ranking and/or recommendation may be based on, for example, whether one or more roads along a route between the client device location and a shelter are available (e.g., accessible) or unavailable (e.g., inaccessible), a road weight and/or road type of one or more roads along the route, a travel distance along a route that includes the one or more roads, an estimated traffic volume along the route, information regarding a maximum capacity of the shelter (e.g., a number of people that the shelter can hold), information regarding an estimated current capacity of the shelter (e.g., a number of people that the shelter is currently holding), information regarding a user of the client device (e.g., age, gender, marital status, or health status, among other examples), and/or the like.

For example, a shelter that is accessible may receive a higher ranking or recommendation than a shelter that is not accessible, a shelter that has a shorter travel distance may receive a higher ranking or recommendation than a shelter that has a longer travel distance, a shelter with a lower traffic volume along a route to the shelter may receive a higher ranking or recommendation than a shelter with a higher traffic volume, a shelter with a higher average road weight along a route to the shelter may receive a higher ranking or recommendation than a shelter with a lower average road weight along a route to the shelter, a shelter with a certain road type (e.g., primary road) along a route to the shelter may receive a higher ranking or recommendation than a shelter with another road type (e.g., secondary road) along a route to the shelter, a shelter with a larger maximum capacity may receive a higher ranking or recommendation than a shelter with a smaller maximum capacity, a shelter with a smaller current capacity may receive a higher ranking or recommendation than a shelter with a larger current capacity, a shelter with a smaller ratio of current capacity to maximum capacity may receive a higher ranking or recommendation than a shelter with a larger ratio of current capacity to maximum capacity, and/or the like.

As shown in FIG. 1M, and by reference number 165, the mapping platform may provide, to the client device, a user interface that indicates a route from a location of the client device to one or more shelters. For example, the mapping platform may provide display parameters to the client device, and the display parameters may define a user interface to be provided and/or rendered for display by the client device, as described above. In some implementations, the mapping platform may provide information that permits the client device to indicate a route on a map displayed on the user interface, and/or to output navigation directions (e.g., on a display, via a speaker, and/or the like). In some implementations, the mapping platform may indicate navigation directions to multiple shelters along with a ranking of each shelter. The client device may initially (e.g., upon opening an associated application, receiving the navigation directions, and/or the like) provide navigation directions to a shelter with a highest ranking. If a user of the client device interacts with the client device to select a different shelter, then the client device may provide navigation directions to the selected shelter. Additionally, or alternatively, if the user of the client device or another user of another client device in communication with the mapping platform indicates that a road on a route to a shelter is inaccessible, then the mapping platform may provide information to update the display of the client device to show a route to a different shelter and provide associated navigation directions.

For example, and as shown, the mapping platform may provide, to the client device, information that identifies a recommended (e.g., primary) shelter, shown as "Resource Center," and may provide, to the client device, information that identifies an alternative (e.g., secondary) shelter, shown as "Primary School." As further shown, the mapping platform may provide information that indicates a route from the client device location, shown as "Your Location," to the recommended shelter (shown as "Recommended Route"). As further shown, a user of the client device may interact with the user interface to select a road (e.g., an entire road or a road segment), and may interact with an input mechanism provided via the user interface to indicate that the road is inaccessible (or otherwise unavailable). The user may select a road, for example, using a click and drag gesture, using a double-click and drag gesture, by selecting two or more intersections to indicate that a road between the intersections is unavailable, and/or the like.

Based on user interaction with the user interface to mark a road as inaccessible, the client device may provide information that identifies the marked road to the mapping platform. The mapping platform may update a directed graph based on the information (as described above), may update a recommended shelter and provide an updated recommended shelter (which may be the same shelter or a different shelter) to the client device, may determine a new route to the updated recommended shelter and provide the new route to the client device, and/or the like. The mapping platform may provide such information to the client device from which the indication of the inaccessible road was received. Additionally, or alternatively, the mapping platform may provide such information to one or more client devices impacted by the inaccessible road. For example, the mapping platform may store information regarding client devices to which recommended shelters have been indicated, client devices to which recommended routes have been indicated, and/or the like. The mapping platform may identify client devices to which a route that includes the inaccessible road was indicated, and may determine an updated recommended shelter and/or a new route for those client devices, and may provide the updated recommended shelter and/or the new route to those client devices for display.

For example, as shown in FIG. 1N, and by reference number 170, the mapping platform may provide, to one or more client devices, a user interface that indicates a route from a location of the client device to a different shelter. In this case, the previously recommended shelter may be inaccessible (e.g., due to no routes form the client device location to the previously recommended shelter) or the previously recommended shelter may have been re-ranked with a lower ranking than an alternative shelter. In some implementations, the mapping platform may provide information regarding an inaccessible shelter and/or an inaccessible road, and the client device may indicate such information on the user interface, as shown. In some implementations, the mapping platform may mark a road as inaccessible and/or update recommendations based on a threshold number of users indicating a road as inaccessible, based on a particular type of user marking a road as inaccessible (e.g., a trusted user, a user responsible for a shelter, a government agency, and/or the like), and/or the like. Additionally, or alternatively, the mapping platform may request feedback from other users via one or more client devices. Based on the request, the client device may output a prompt that requests feedback from a user when the client device is within a threshold proximity of a road marked as inaccessible. For example, the client device may output information that indicates that a road has been marked as inaccessible and may request that user of the client device provide input to indicate whether the road is still inaccessible. The client device may provide such user input to the mapping platform, and the mapping platform may mark a road as accessible or inaccessible based on the input. The mapping platform may generate new recommendations if the marking has changed, as described above.

Additionally, or alternatively, the client device may provide information indicative of an inaccessible road to the mapping platform without direct user input. For example, if the client device traverses a route according to navigation directions, but then begins traversing a different route than one that is indicated or recommended, then the client device may provide an indication of the location where the change in travel occurred. A change in travel direction from an indicated or recommended route may be indicative of an inaccessible road. If the mapping platform receives such an indication (e.g., from a single client device, from multiple client devices, from a threshold quantity of client devices, and/or the like), then the mapping platform may mark the road as inaccessible. As used herein, inaccessible may mean partly inaccessible or entirely inaccessible.

As shown in FIG. 1O, and by reference number 175, in some cases, the mapping platform may provide, to a client device, a user interface that indicates that there are no routes from a location of the client device to a shelter. For example, if one or more roads are inaccessible, then there may not be a route from one or more buildings (e.g., a location of the client device) to any shelter. In this case, the mapping platform may provide an indication of an area (e.g., a polygon bounded by coordinates) in which there are no safe routes to a shelter, and the client device may provide an indication of such an area, as shown.

In some implementations, the mapping platform may recommend one or more route starting points for a user of the client device to seek out. A route starting point (or starting point) may refer to a location on or along a road that is part of an accessible route to a shelter (e.g., there is a route from the starting point to the shelter along accessible roads). For example, the mapping platform may indicate one or more recommended starting points and/or may rank starting points, and may provide information regarding the one or more recommended starting points and/or the ranked starting points to the client device for display on the client device. In some implementations, the mapping platform may only provide information (e.g., starting point objects that includes geographic coordinates) associated with recommended starting points to the client device, and may refrain from providing information for non-recommended starting points to the client device. Alternatively, the mapping platform may provide information for both recommended starting points and non-recommended starting points to the client device, and may provide an indication of whether a starting point is recommended or non-recommended. The client device may display representations of recommended and non-recommended starting points differently (e.g., using a different color, label, and/or the like).

The mapping platform may determine a ranking for starting points and/or may identify recommended starting points using a machine learning algorithm, as described in more detail below in connection with FIG. 2 and FIG. 3. The ranking and/or recommendation may be based on, for example, a travel distance between the client device location and a starting point, a number of shelters accessible via a route that starts at the starting point, an average distance between the starting point and shelters that are accessible via a route that starts at the starting point, whether one or more roads along a route between the starting point and a shelter are available (e.g., accessible) or unavailable (e.g., inaccessible), a travel distance along a route that starts at the starting point and includes the one or more roads, an estimated traffic volume along the route, information regarding a maximum capacity of the shelter (e.g., a number of people that the shelter can hold), information regarding an estimated current capacity of the shelter (e.g., a number of people that the shelter is currently holding), and/or the like.

For example, a starting point that has a shorter travel distance from the client device location may receive a higher ranking or recommendation than a starting point that has a longer travel distance from the client device location, a starting point that has more shelters accessible from the starting point may receive a higher ranking or recommendation than a starting point that has fewer shelters accessible from the starting point, a starting point that has a shorter average travel distance to shelters accessible from the starting point may receive a higher ranking or recommendation than a starting point that has a longer average travel distance to shelters accessible from the starting point, and/or the like. Additionally, or alternatively, a starting point ranking and/or recommendation may depend on a ranking and/or recommendation for shelters accessible via the starting point, as described above. For example, a starting point with access to a shelter with a higher ranking may receive a higher ranking than a starting point with access to a shelter with a lower ranking, a starting point with access to one or more shelters with a higher average ranking may receive a higher ranking than a starting point with access to one or more shelters with a lower average ranking, and/or the like.

By identifying shelters and routes to those shelters, and dynamically updating information provided to a client device to generate an interface for displaying those shelters and routes (e.g., based on feedback indicating accessible and/or inaccessible roads), implementations described herein enable an intuitive and up-to-date user interface that can be used to guide people along available routes. Some implementations can determine or generate technical parameters (e.g., map objects, such as building objects, road objects, shelter objects, and/or the like) for a user interface and providing those technical parameters to enable the user interface to be rendered for display on a device. Using such a mapping system, a user can be informed of a best route to shelter in a city road network, can be informed of an alternative route if an original evacuation route becomes damaged, can determine that there are no evacuation routes, and/or the like. Some implementations described herein can be used by policy makers and/or decision makers to plan and/or communicate evacuation scenarios to improve resilience to natural disasters even when evacuation routes change.

While implementations are described in connection with FIGS. 1A-1O in connection with an evacuation event or a natural disaster event, similar implementations may be used with other events. For example, rather than indicating routes to shelters, the mapping system could indicate routes to voting locations, parking lots, entertainment venues, hotels, and/or the like. In some cases, rather than or in addition to roads being marked as available or unavailable, destinations could be marked as available or unavailable in a similar manner as described herein in connection with roads. For example, a venue or shelter could become unavailable when a maximum capacity is reached, a parking lot could become unavailable when a maximum number of vehicles are parked in the parking lot and/or when there are no available parking spots, and/or the like, a hotel could become unavailable when there are no vacancies, and/or the like.

As indicated above, FIGS. 1A-1O are provided as an example. Other examples may differ from what is described in FIGS. 1A-1O. The number and arrangement of devices shown in FIGS. 1A-1O are provided as an example. In practice, there may be additional devices, fewer devices, different devices, or differently arranged than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) shown in FIGS. 1A-1O may perform one or more functions described as being performed by another set of devices shown in FIGS. 1A-1O.

Figure 2:
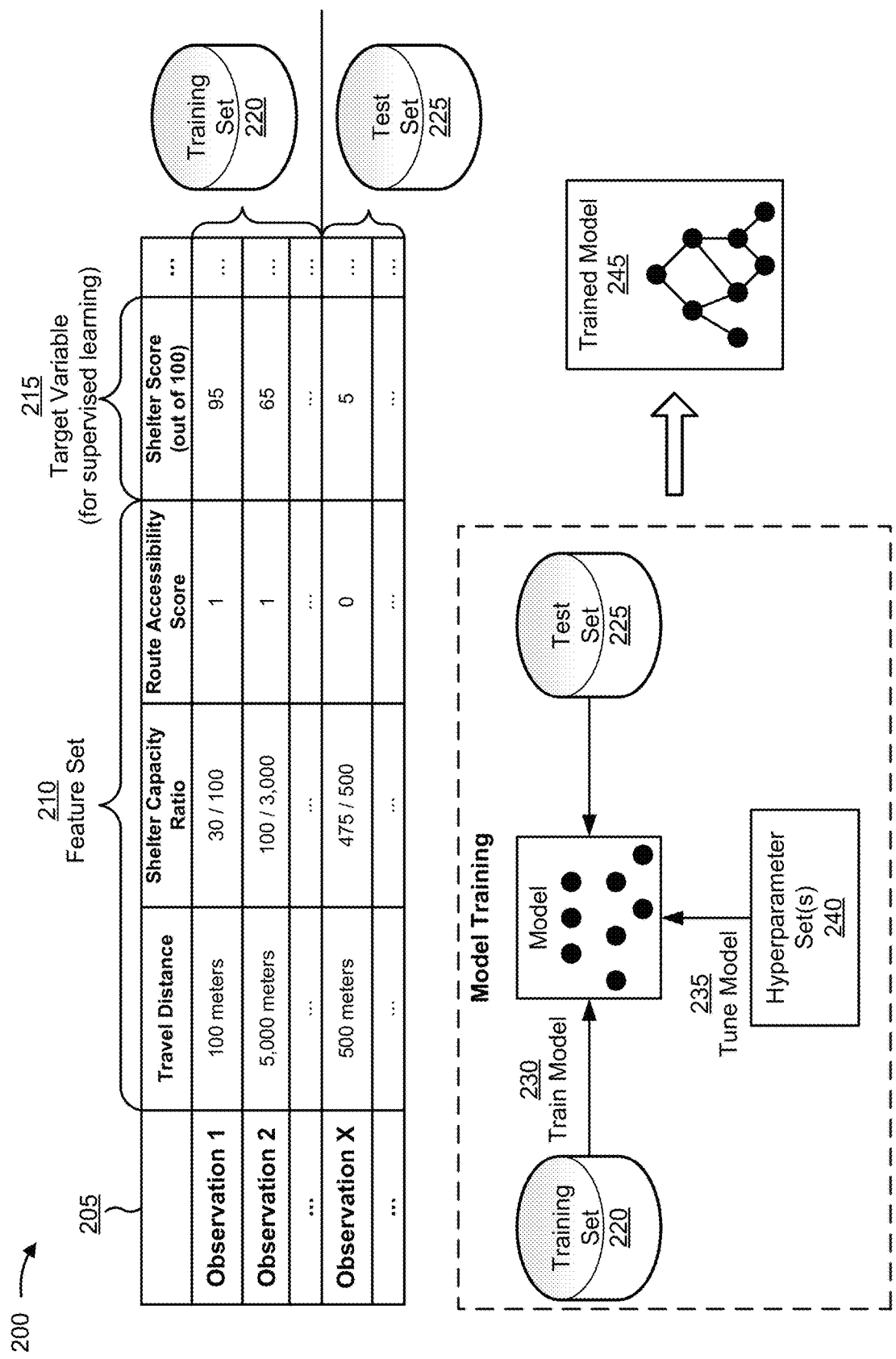
FIG. 2 is a diagram illustrating an example of training a machine learning model in connection with mapping, routing, and/or navigation.

FIG. 2 is a diagram illustrating an example 200 of training a machine learning model in connection with mapping, routing, and/or navigation. The machine learning model training described herein may be performed using a machine learning system. The machine learning system may include or may be included in a computing device, a server, a cloud computing environment, and/or the like, such as mapping platform 401 described in more detail below.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to one or more client devices 430 and/or information received from one or more server devices 440, as described elsewhere herein. In some implementations, the machine learning system may receive the set of observations (e.g., as input) from client device 430 and/or server device 440.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from client device 430 and/or server device 440. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from client device 430 and/or server device 440, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of travel distance (e.g., travel distance between a client device location and a shelter), a second feature of shelter capacity ratio (e.g., a ratio between an estimated current capacity and a maximum capacity of a shelter), a third feature of route accessibility score (e.g., an indication of an accessibility level or danger level associated with a route from the client device location, which may be a binary indication of accessible or inaccessible, or may have a score along a range depending on a reason for inaccessibility), and so on. As shown, for a first observation, the first feature may have a value of 100 meters, the second feature may have a value of 30 out of 100, the third feature may have a value of 1 (e.g., a binary value indicating that the route is accessible), and so on. These features and feature values are provided as examples and may differ in other examples. For example, the feature set may include one or more of the following features: whether one or more roads along a route between the client device location and a shelter are available (e.g., accessible) or unavailable (e.g., inaccessible), a road weight and/or road type of one or more roads along the route, a travel distance along a route that includes the one or more roads, an estimated traffic volume along the route, information regarding a maximum capacity of the shelter (e.g., a number of people that the shelter can hold), information regarding an estimated current capacity of the shelter (e.g., a number of people that the shelter is currently holding), and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is a shelter score, which has a value of 95 out of 100 for the first observation. The shelter score may be used by the machine learning system and/or the mapping platform 401 to determine one or more recommended shelters (e.g., with shelter scores that satisfy a threshold), to rank shelters (e.g., by score), and/or the like. Although the shelter score is shown as a numeric value within a range (e.g., from 0 to 100), other ranges for the score are possible. In some implementations, the shelter score may be a binary value (e.g., 1 or 0, representing a recommended shelter or a non-recommend shelter, respectively).

The feature set and target variable described above are provided as examples, and other examples may differ from what is described above. For example, for a target variable of starting point score, the feature set may include one or more features described above in connection with a shelter score for a shelter accessible via a route that starts at a starting point, a travel distance between the client device location and a starting point, a number of shelters accessible via a route that starts at the starting point, an average distance between the starting point and shelters that are accessible via a route that starts at the starting point, whether one or more roads along a route between the starting point and a shelter are available (e.g., accessible) or unavailable (e.g., inaccessible), a travel distance along a route that starts at the starting point and includes the one or more roads, an estimated traffic volume along the route, information regarding a maximum capacity of the shelter (e.g., a number of people that the shelter can hold), information regarding an estimated current capacity of the shelter (e.g., a number of people that the shelter is currently holding), and/or the like. The starting point score may be a numeric value within a range, or may be a binary value, as described above. The starting point score may be used by the machine learning system and/or the mapping platform 401 to determine one or more recommended starting points (e.g., with starting point scores that satisfy a threshold), to rank starting points (e.g., by score), and/or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or other types of machine learning models. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
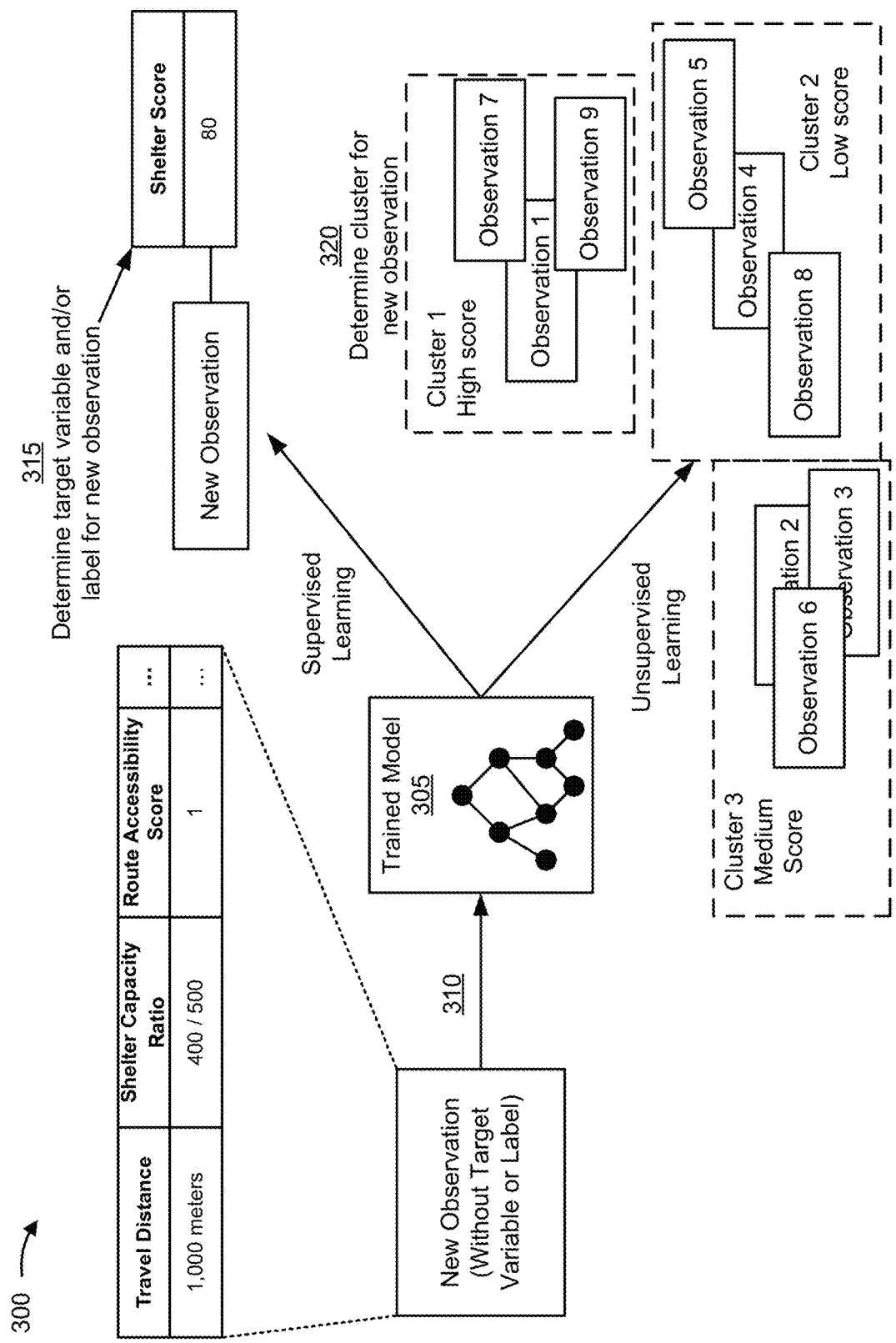
FIG. 3 is a diagram illustrating an example of applying a trained machine learning model to a new observation in connection with mapping, routing, and/or navigation

FIG. 3 is a diagram illustrating an example 300 of applying a trained machine learning model to a new observation in connection with mapping, routing, and/or navigation. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as mapping platform 401.

As shown by reference number 310, the machine learning system may receive a new observation (or a set of new observations) and may input the new observation to the machine learning model 305. As shown, the new observation may include a first feature of travel distance, a second feature of shelter capacity ratio, a third feature of route accessibility score, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of 80 for the target variable of shelter score for the new observation, as shown by reference number 315. Based on this prediction (e.g., based on the value having a particular label or classification, based on the value satisfying or failing to satisfy a threshold, and/or the like), the machine learning system may provide a recommendation and/or output for determination of a recommendation, such as a recommended shelter, a ranking of shelters, and/or the like. Additionally, or alternatively, the machine learning system may perform an automated action and/or may cause an automated action to be performed (e.g., by instructing another device to perform the automated action), such as providing information regarding recommended and/or ranked shelters to a client device, determining and/or providing navigation directions to the shelter(s), causing emergency services and/or an autonomous vehicle to be dispatched to a client device location and driven to a recommended shelter, and/or the like. As another example, if the machine learning system were to predict a value of 10 for the target variable of shelter score, then the machine learning system may provide a different recommendation (e.g., do not recommend the shelter and/or give a low ranking to the shelter) and/or may perform or cause performance of a different automated action (e.g., refrain from performing the actions described above with regard to a higher shelter score). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a high score cluster, then the machine learning system may provide a recommendation and/or may cause an automated action to be performed (e.g., by instructing another device to perform the automated action), such as the recommendations and/or actions described above in connection with a high shelter score. As another example, if the machine learning system were to classify the new observation in a low score cluster, then the machine learning system may provide a different recommendation and/or may perform or cause performance of a different automated action, such as the recommendations and/or actions described above in connection with a high shelter score. As another example, if the machine learning system were to classify the new observation in a low score cluster, then the machine learning system may provide a different recommendation and/or may perform or cause performance of a different automated action, such as providing information associated with the medium score shelters only if client device input indicates that all of the high score shelters have become unavailable or inaccessible.

The recommendations, actions, and clusters described above are provided as examples, and other examples may differ from what is described above. For example, the recommendations associated with a starting point may include recommending or not recommending a starting point to a client device. The actions associated with a starting point may include providing information regarding recommended and/or ranked starting point to a client device, determining and/or providing navigation directions from the starting point to a shelter, causing emergency services and/or an autonomous vehicle to be dispatched to the starting point (e.g., a starting location or an original location) and driven to a recommended shelter (e.g., a destination location), and/or the like. The clusters associated with a starting point may include, for example, a high score cluster, a low score cluster, and a medium score cluster, which may be associated with similar recommendations and/or actions as described above.

In this way, the machine learning system may apply a rigorous and automated process to recommend shelters and/or starting points. The machine learning system enables recognition and/or identification of tens, hundreds, thousands, or millions of features and/or feature values for tens, hundreds, thousands, or millions of observations, thereby increasing accuracy and consistency and reducing delay associated with generating the recommendation relative to requiring computing resources to be allocated for tens, hundreds, or thousands of operators to manually recommend shelters and/or starting points using the features or feature values.

As indicated above, FIG. 3 is provided as an example. Other examples may differ from what is described in connection with FIG. 3.

Figure 4:
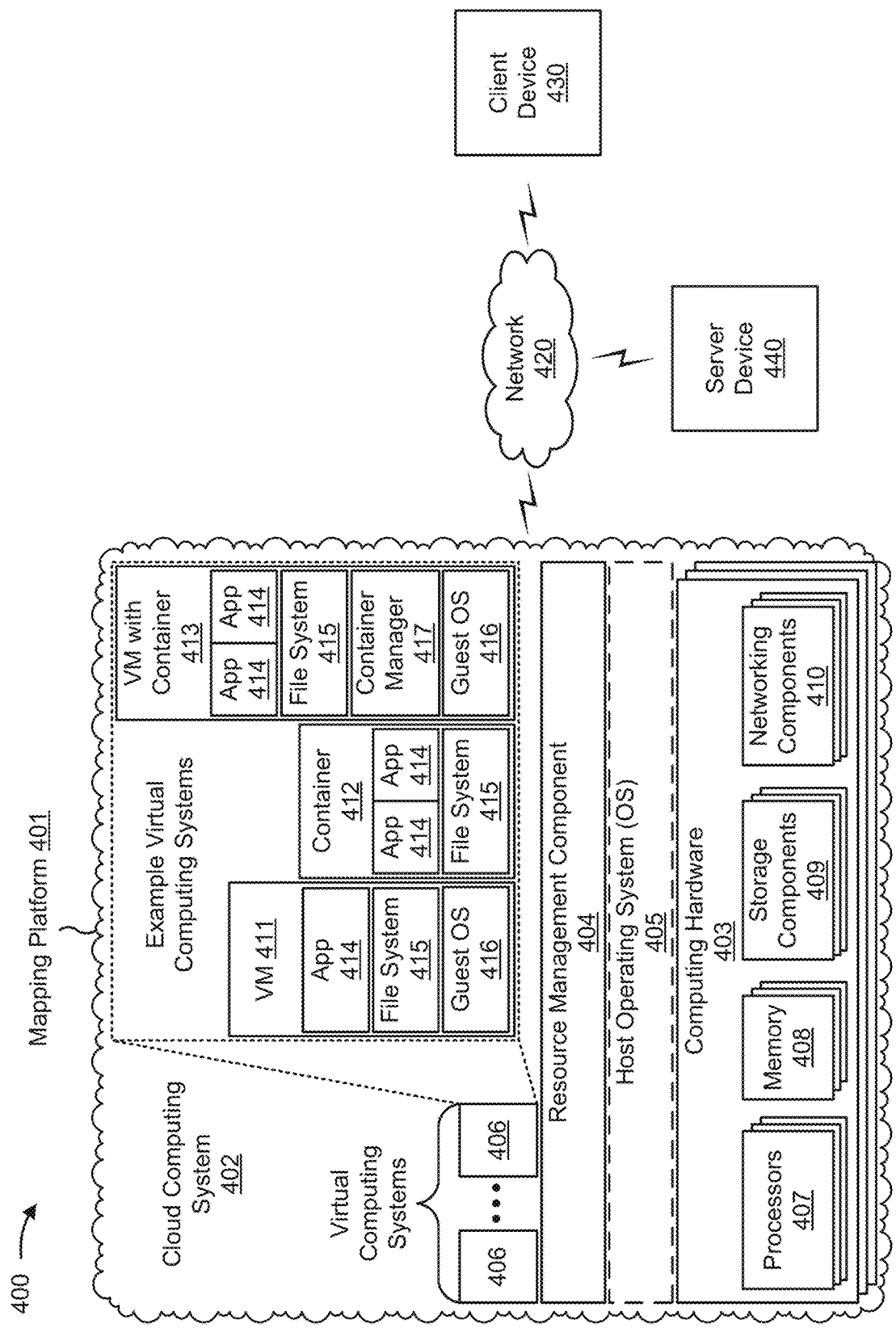
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a mapping platform 401. The mapping platform 401 may include one or more elements of a cloud computing system 402 and/or may execute within the cloud computing system 402 (e.g., as one or more virtual computing systems 406). The cloud computing system 402 may include one or more elements 403-417, as described in more detail below.

As further shown in FIG. 4, environment 400 may include a network 420, a client device 430, and/or a server device 440. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the mapping platform 401 to perform one or more operations or processes described herein. A storage component 409 includes a hard disk or another type of storage device that stores information, data, and/or software (e.g., code, instructions, and/or the like) related to the operation and use of the mapping platform 401. In some implementations, memory 408 and/or storage component 409 is/are implemented as a non-transitory computer readable medium. A networking component 410 includes a network interface and corresponding hardware that enables the mapping platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the mapping platform 401 may include one or more elements 403-417 of the cloud computing system 402, may execute within the cloud computing system 402, and/or may be hosted within the cloud computing system 402, in some implementations, the mapping platform 401 may not be cloud-based (e.g., may be implemented outside of a cloud computing system) or may be partially cloud-based. For example, the mapping platform 401 may include one or more devices that are not part of the cloud computing system 402, such as device 500 of FIG. 5, which may include a standalone server or another type of computing device. The mapping platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The client device 430 includes one or more devices capable of receiving, generating, storing, processing, and/or providing information associated with mapping, routing, and/or navigation, as described elsewhere herein. The client device 430 may include a communication device and/or a computing device. For example, the client device 430 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 430 may communicate with one or more other devices of environment 400, as described elsewhere herein.

The server device 440 includes one or more devices capable of receiving, generating, storing, processing, providing, and/or routing information associated with mapping, routing, and/or navigation, as described elsewhere herein. The server device 440 may include a communication device and/or a computing device. For example, the server device 440 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 440 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
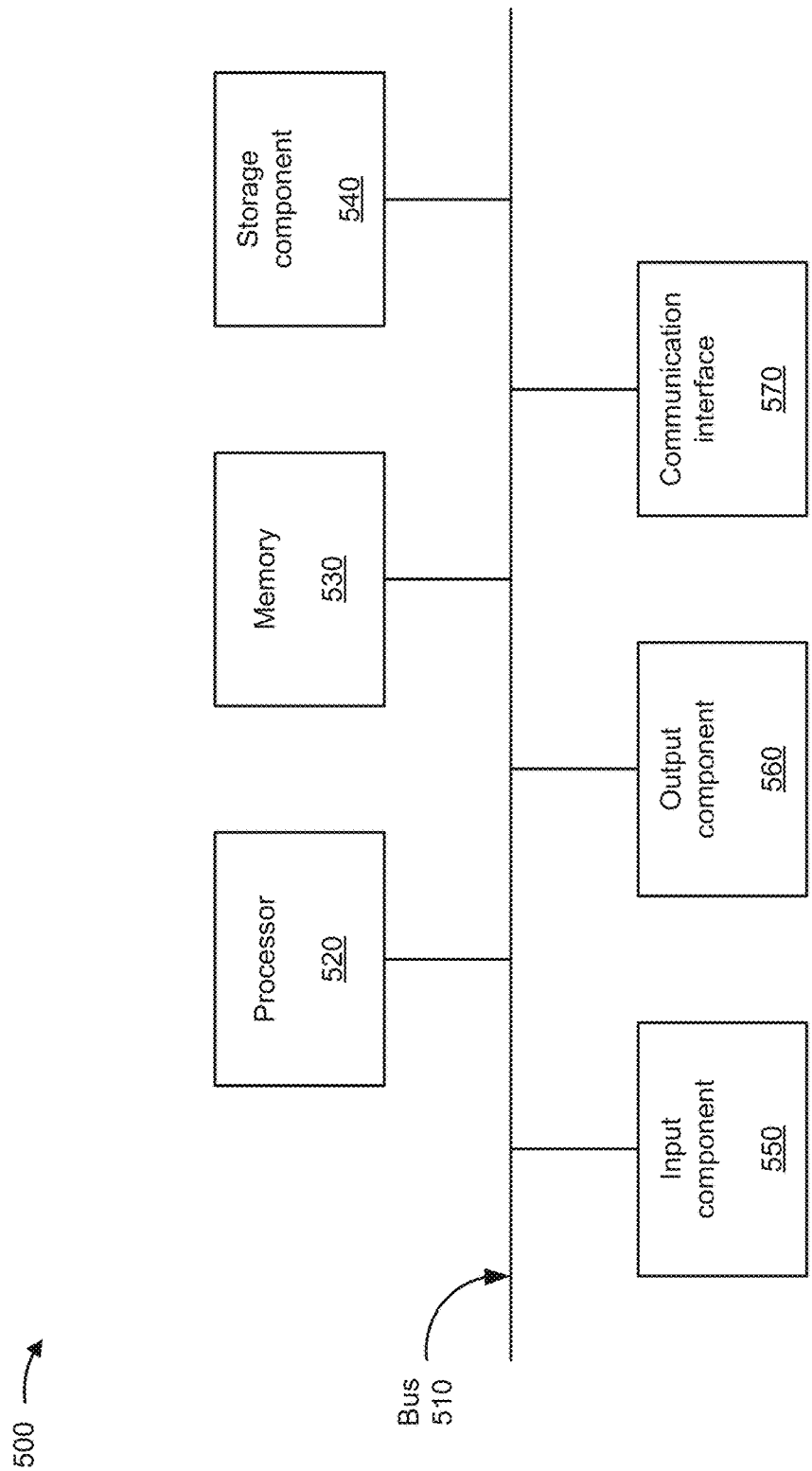
FIG. 5 is a diagram of example components of one or more devices of FIG. 2.

FIG. 5 is a diagram of example components of a device 500. Device 500 may correspond to mapping platform 401, client device 430, and/or server device 440. In some implementations, mapping platform 401, client device 430, and/or server device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
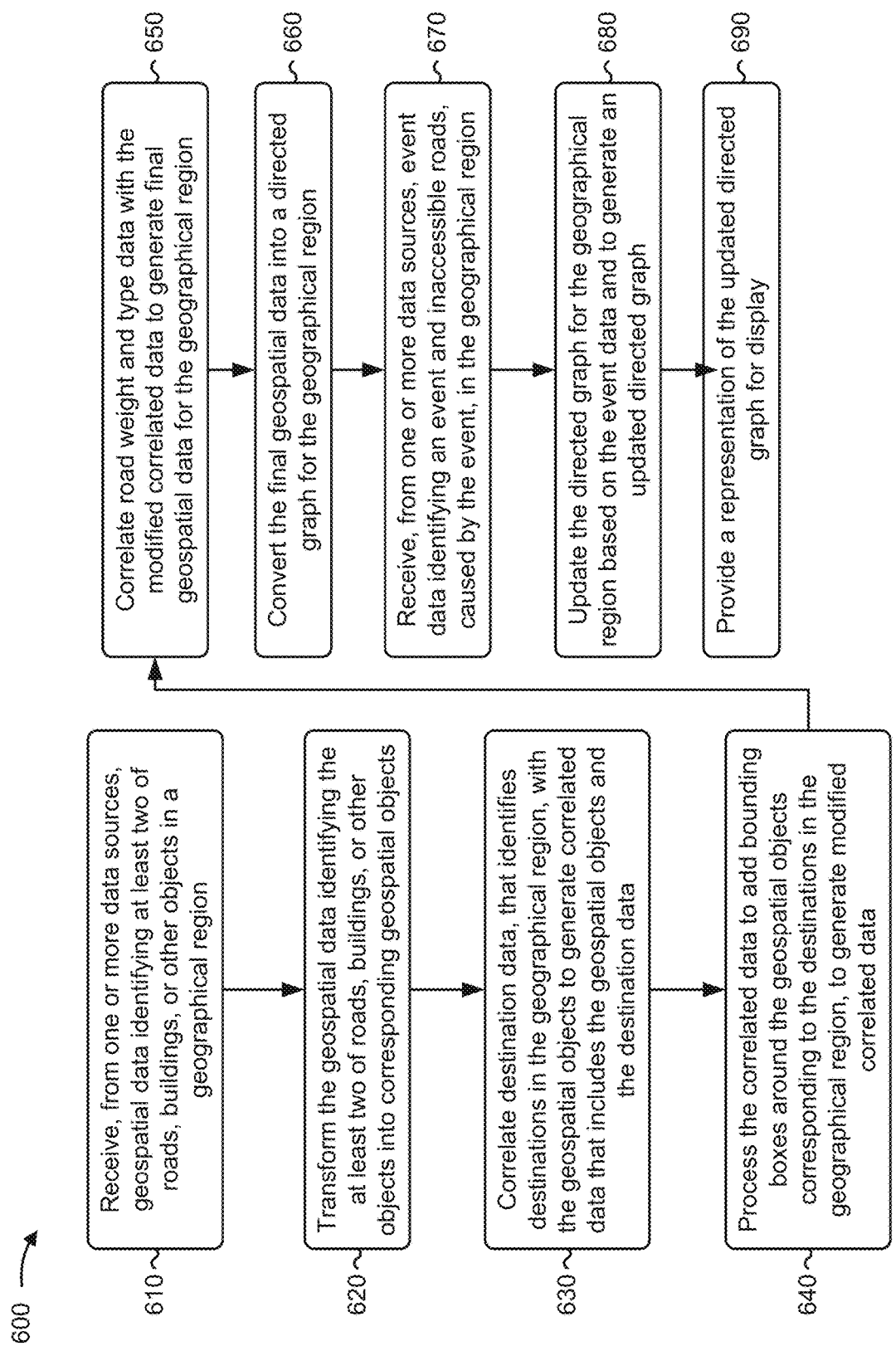
FIGS. 6-8 are flow charts of example processes relating to mapping systems and user interfaces.

FIG. 6 is a flow chart of an example process 600 associated with mapping, routing, and navigation. In some implementations, one or more process blocks of FIG. 6 may be performed by a device (e.g., mapping platform 401, one or more devices of mapping platform 401, and/or the like). In some implementations, one or more process blocks of FIG. 6 may be performed by another device or a group of devices separate from or including the device, such as a client device (e.g., client device 430), a server device (e.g., server device 440), and/or the like.

As shown in FIG. 6, process 600 may include receiving, from one or more data sources, geospatial data identifying at least two of roads, buildings, or other objects in a geographical region (block 610). For example, the device (e.g., using processor 520, memory 530, storage component 540, input component 550, output component 560, communication interface 570, and/or the like) may receive, from one or more data sources, geospatial data identifying at least two of roads, buildings, or other objects in a geographical region, as described above.

As further shown in FIG. 6, process 600 may include transforming the geospatial data identifying the at least two of roads, buildings, or other objects into corresponding geospatial objects (block 620). For example, the device (e.g., using processor 520, memory 530, storage component 540, input component 550, output component 560, communication interface 570, and/or the like) may transform the geospatial data identifying the at least two of roads, buildings, or other objects into corresponding geospatial objects, as described above.

As further shown in FIG. 6, process 600 may include correlating destination data, that identifies destinations in the geographical region, with the geospatial objects to generate correlated data that includes the geospatial objects and the destination data (block 630). For example, the device (e.g., using processor 520, memory 530, storage component 540, input component 550, output component 560, communication interface 570, and/or the like) may correlate destination data, that identifies destinations in the geographical region, with the geospatial objects to generate correlated data that includes the geospatial objects and the destination data, as described above.

As further shown in FIG. 6, process 600 may include processing the correlated data to add bounding boxes around the geospatial objects corresponding to the destinations in the geographical region, to generate modified correlated data (block 640). For example, the device (e.g., using processor 520, memory 530, storage component 540, input component 550, output component 560, communication interface 570, and/or the like) may process the correlated data to add bounding boxes around the geospatial objects corresponding to the destinations in the geographical region, to generate modified correlated data, as described above.

As further shown in FIG. 6, process 600 may include correlating road weight and type data with the modified correlated data to generate final geospatial data for the geographical region (block 650). For example, the device (e.g., using processor 520, memory 530, storage component 540, input component 550, output component 560, communication interface 570, and/or the like) may correlate road weight and type data with the modified correlated data to generate final geospatial data for the geographical region, as described above.

As further shown in FIG. 6, process 600 may include converting the final geospatial data into a directed graph for the geographical region (block 660). For example, the device (e.g., using processor 520, memory 530, storage component 540, input component 550, output component 560, communication interface 570, and/or the like) may convert the final geospatial data into a directed graph for the geographical region, as described above.

As further shown in FIG. 6, process 600 may include receiving, from one or more data sources, event data identifying an event and inaccessible roads, caused by the event, in the geographical region (block 670). For example, the device (e.g., using processor 520, memory 530, storage component 540, input component 550, output component 560, communication interface 570, and/or the like) may receive, from one or more data sources, event data identifying an event and inaccessible roads, caused by the event, in the geographical region, as described above.

As further shown in FIG. 6, process 600 may include updating the directed graph for the geographical region based on the event data, to generate an updated directed graph (block 680). For example, the device (e.g., using processor 520, memory 530, storage component 540, input component 550, output component 560, communication interface 570, and/or the like) may update the directed graph for the geographical region based on the event data, to generate an updated directed graph, as described above.

As further shown in FIG. 6, process 600 may include providing a representation of the updated directed graph for display (block 690). For example, the device (e.g., using processor 520, memory 530, storage component 540, input component 550, output component 560, communication interface 570, and/or the like) may provide a representation of the updated directed graph for display, as described above.

Process 600 may include additional implementations, such as any single implementation or any combination of implementations described below and/or in connection with one or more other processes described elsewhere herein.

In a first implementation, each of the bounding boxes is defined by an area between two latitudinal lines and two longitudinal lines.

In a second implementation, alone or in combination with the first implementation, process 600 includes receiving updated event data identifying updates to the event and additional inaccessible roads in the geographical region; updating the updated directed graph for the geographical region based on the updated event data and to generate a further updated directed graph; and providing a representation of the further updated directed graph for display.

In a third implementation, alone or in combination with one or more of the first and second implementations, process 600 includes receiving, from a client device of a user, location data identifying a location of the client device in the geographical region; processing the updated directed graph and the location data, with a machine learning model, to identify one or more destinations associated with the location of the client device; and performing one or more actions based on identifying the one or more destinations.

In a fourth implementation, alone or in combination with one or more of the first through third implementations, process 600 includes receiving data identifying additional inaccessible roads in the geographical region; updating the updated directed graph for the geographical region based on the data identifying the additional inaccessible roads and to generate a further updated directed graph; processing the further updated directed graph and the location data to determine that there are no routes from the location of the client device to the destinations; and causing emergency services personnel or an autonomous vehicle to be dispatched to the location of the client device.

In a fifth implementation, alone or in combination with one or more of the first through fourth implementations, process 600 includes providing, to the client device, a user interface that indicates there are no routes from the location to the destinations.

In a sixth implementation, alone or in combination with one or more of the first through fifth implementations, process 600 includes receiving, from a client device of a user, location data identifying a location of the client device in the geographical region; processing the updated directed graph and the location data, with a machine learning model, to identify one or more destinations associated with the location of the client device; and providing, to the client device, a user interface that includes a route from the location to one of the one or more destinations.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
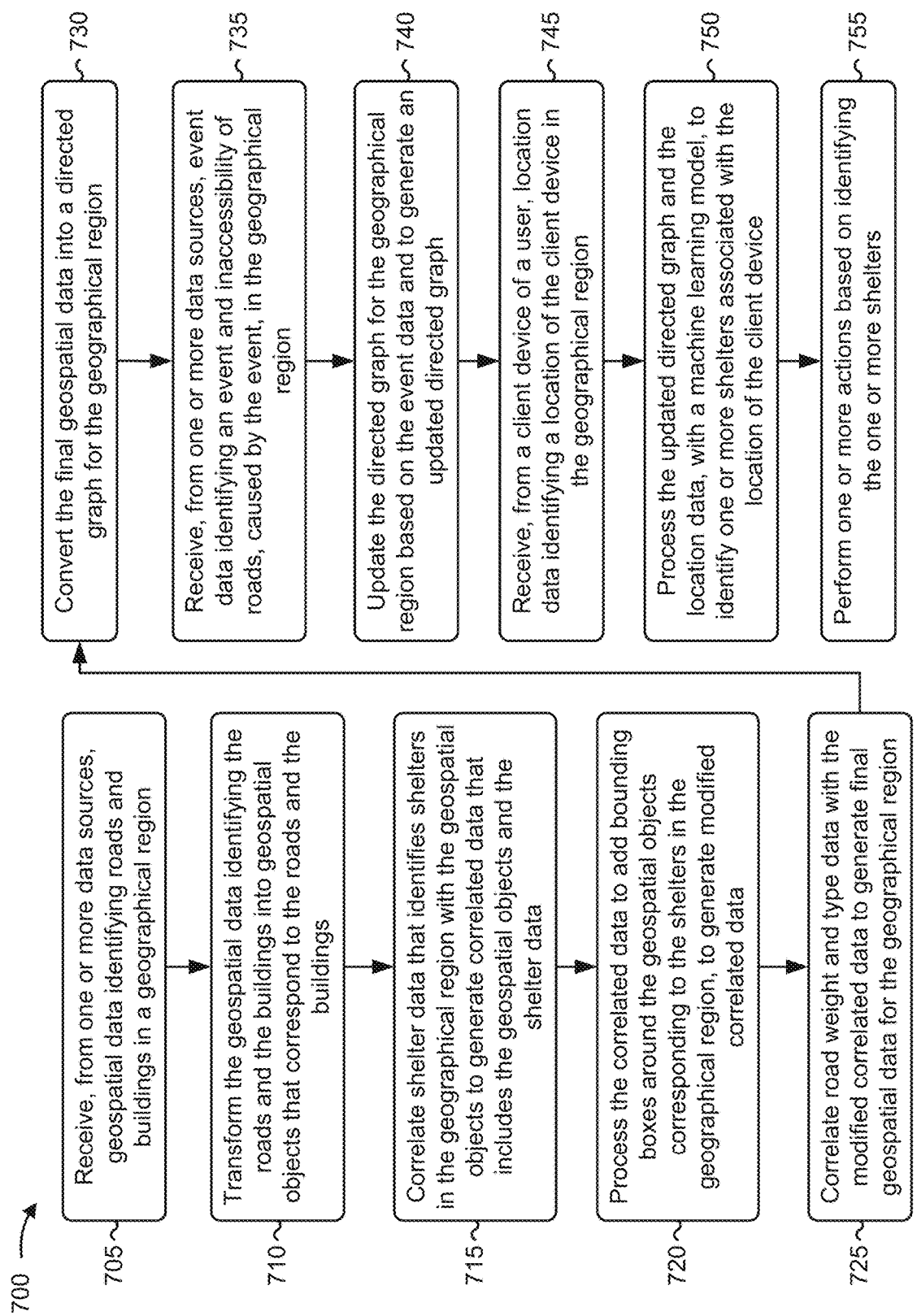

FIG. 7 is a flow chart of an example process 700 associated with mapping, routing, and navigation. In some implementations, one or more process blocks of FIG. 7 may be performed by a device (e.g., mapping platform 401, one or more devices of mapping platform 401, and/or the like). In some implementations, one or more process blocks of FIG. 7 may be performed by another device or a group of devices separate from or including the device, such as a client device (e.g., client device 430), a server device (e.g., server device 440), and/or the like.

As shown in FIG. 7, process 700 may include receiving, from one or more data sources, geospatial data identifying roads and buildings in a geographical region (block 705). For example, the device (e.g., using processor 520, memory 530, storage component 540, input component 550, output component 560, communication interface 570, and/or the like) may receive, from one or more data sources, geospatial data identifying roads and buildings in a geographical region, as described above.

As further shown in FIG. 7, process 700 may include transform the geospatial data identifying the roads and the buildings into geospatial objects that correspond to the roads and the buildings (block 710). For example, the device (e.g., using processor 520, memory 530, storage component 540, input component 550, output component 560, communication interface 570, and/or the like) may transform the geospatial data identifying the roads and the buildings into geospatial objects that correspond to the roads and the buildings, as described above.

As further shown in FIG. 7, process 700 may include correlating shelter data that identifies shelters in the geographical region with the geospatial objects to generate correlated data that includes the geospatial objects and the shelter data (block 715). For example, the device (e.g., using processor 520, memory 530, storage component 540, input component 550, output component 560, communication interface 570, and/or the like) may correlate shelter data that identifies shelters in the geographical region with the geospatial objects to generate correlated data that includes the geospatial objects and the shelter data, as described above.

As further shown in FIG. 7, process 700 may include processing the correlated data to add bounding boxes around the geospatial objects corresponding to the shelters in the geographical region, to generate modified correlated data (block 720). For example, the device (e.g., using processor 520, memory 530, storage component 540, input component 550, output component 560, communication interface 570, and/or the like) may process the correlated data to add bounding boxes around the geospatial objects corresponding to the shelters in the geographical region, to generate modified correlated data, as described above.

As further shown in FIG. 7, process 700 may include correlating road weight and type data with the modified correlated data to generate final geospatial data for the geographical region (block 725). For example, the device (e.g., using processor 520, memory 530, storage component 540, input component 550, output component 560, communication interface 570, and/or the like) may correlate road weight and type data with the modified correlated data to generate final geospatial data for the geographical region, as described above.

As further shown in FIG. 7, process 700 may include converting the final geospatial data into a directed graph for the geographical region (block 730). For example, the device (e.g., using processor 520, memory 530, storage component 540, input component 550, output component 560, communication interface 570, and/or the like) may convert the final geospatial data into a directed graph for the geographical region, as described above.

As further shown in FIG. 7, process 700 may include receiving, from one or more data sources, event data identifying an event and inaccessibility of roads, caused by the event, in the geographical region (block 735). For example, the device (e.g., using processor 520, memory 530, storage component 540, input component 550, output component 560, communication interface 570, and/or the like) may receive, from one or more data sources, event data identifying an event and inaccessibility of roads, caused by the event, in the geographical region, as described above.

As further shown in FIG. 7, process 700 may include updating the directed graph for the geographical region based on the event data and to generate an updated directed graph (block 740). For example, the device (e.g., using processor 520, memory 530, storage component 540, input component 550, output component 560, communication interface 570, and/or the like) may update the directed graph for the geographical region based on the event data and to generate an updated directed graph, as described above.

As further shown in FIG. 7, process 700 may include receiving, from a client device of a user, location data identifying a location of the client device in the geographical region (block 745). For example, the device (e.g., using processor 520, memory 530, storage component 540, input component 550, output component 560, communication interface 570, and/or the like) may receive, from a client device of a user, location data identifying a location of the client device in the geographical region, as described above.

As further shown in FIG. 7, process 700 may include processing the updated directed graph and the location data, with a machine learning model, to identify one or more shelters associated with the location of the client device (block 750). For example, the device (e.g., using processor 520, memory 530, storage component 540, input component 550, output component 560, communication interface 570, and/or the like) may process the updated directed graph and the location data, with a machine learning model, to identify one or more shelters associated with the location of the client device, as described above.

As further shown in FIG. 7, process 700 may include performing one or more actions based on identifying the one or more shelters (block 755). For example, the device (e.g., using processor 520, memory 530, storage component 540, input component 550, output component 560, communication interface 570, and/or the like) may perform one or more actions based on identifying the one or more shelters, as described above.

Process 700 may include additional implementations, such as any single implementation or any combination of implementations described below and/or in connection with one or more other processes described elsewhere herein.

In a first implementation, the one or more processors, when performing the one or more actions, are configured to one or more of: provide, to the client device, information identifying the one or more shelters; determine navigation directions to the one or more shelters; or provide, to the client device, navigation directions to the one or more shelters.

In a second implementation, alone or in combination with the first implementation, process 700 includes receiving, from the client device, a selection of a shelter from the one or more shelters; determining navigation directions to the shelter; and providing, to the client device, navigation directions to the shelter.

In a third implementation, alone or in combination with one or more of the first and second implementations, the one or more processors, when performing the one or more actions, are configured to one or more of: cause emergency services personnel or an autonomous vehicle to be dispatched to the location of the client device; or retrain the machine learning model based on identifying the one or more shelters.

In a fourth implementation, alone or in combination with one or more of the first through third implementations, process 700 includes identifying a set of shelters based on proximity to the location of the client device; removing a first subset of shelters, from the set of shelters, that are associated with inaccessible roads; and removing a second subset of shelters, from the set of shelters, that are at capacity, wherein the one or more is sheltering correspond to shelters remaining in the set of shelters after removal of the first subset of shelters and the second subset shelters from the set of shelters.

In a fifth implementation, alone or in combination with one or more of the first through fourth implementations, the event includes one or more of: a natural disaster, a pandemic, a military conflict, or a terrorist act.

In a sixth implementation, alone or in combination with one or more of the first through fifth implementations, the road weight and type data includes data identifying: network strength associated with the roads, primary roads of the roads in the geographical region, or secondary roads of the roads in the geographical region.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
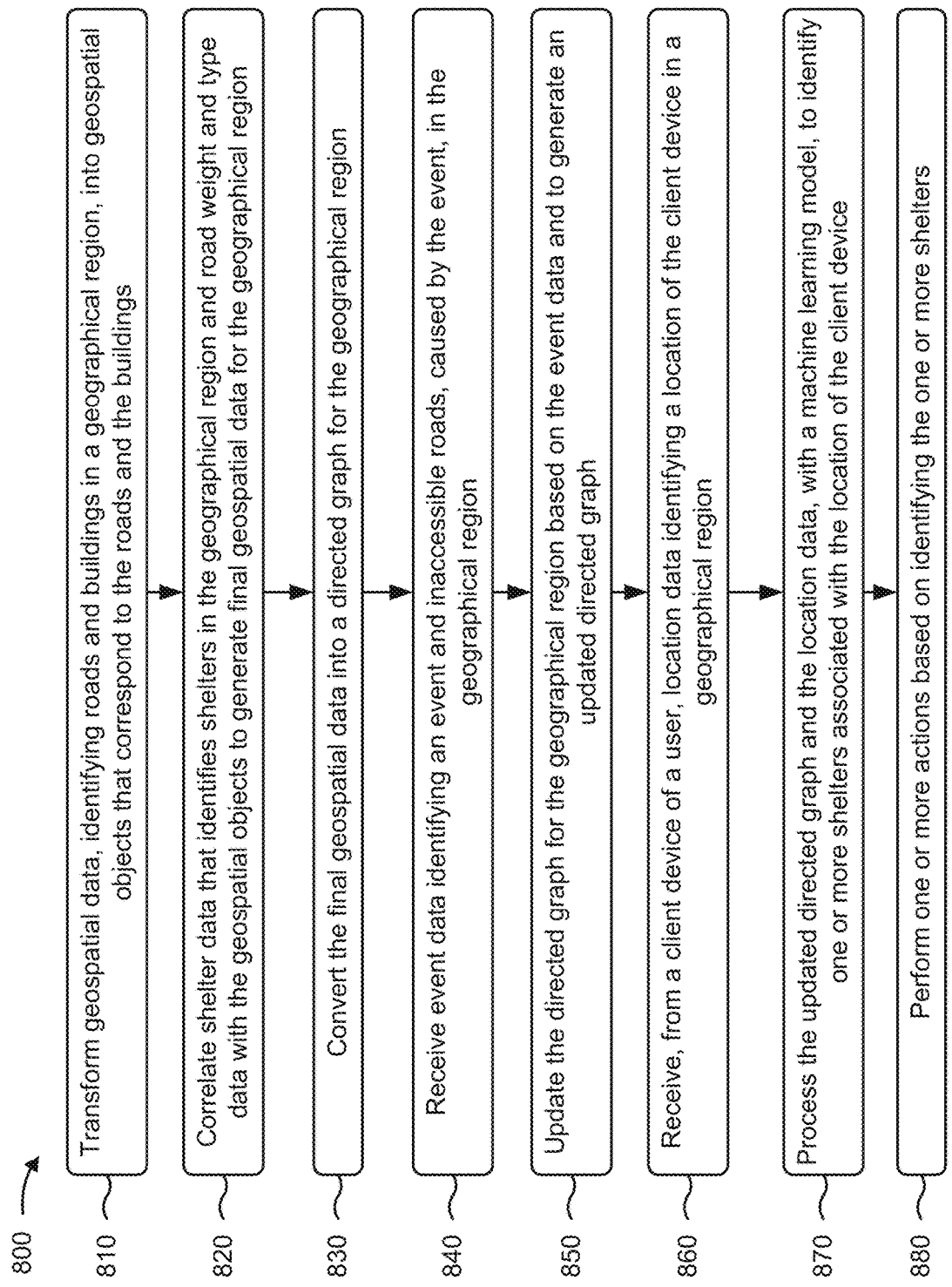

FIG. 8 is a flow chart of an example process 800 associated with mapping, routing, and navigation. In some implementations, one or more process blocks of FIG. 8 may be performed by a device (e.g., mapping platform 401, one or more devices of mapping platform 401, and/or the like). In some implementations, one or more process blocks of FIG. 8 may be performed by another device or a group of devices separate from or including the device, such as a client device (e.g., client device 430), a server device (e.g., server device 440), and/or the like.

As shown in FIG. 8, process 800 may include transform geospatial data, identifying roads and buildings in a geographical region, into geospatial objects that correspond to the roads and the buildings (block 810). For example, the device (e.g., using processor 520, memory 530, storage component 540, input component 550, output component 560, communication interface 570, and/or the like) may transform geospatial data, identifying roads and buildings in a geographical region, into geospatial objects that correspond to the roads and the buildings, as described above.

As further shown in FIG. 8, process 800 may include correlating shelter data that identifies shelters in the geographical region and road weight and type data with the geospatial objects to generate final geospatial data for the geographical region (block 820). For example, the device (e.g., using processor 520, memory 530, storage component 540, input component 550, output component 560, communication interface 570, and/or the like) may correlate shelter data that identifies shelters in the geographical region and road weight and type data with the geospatial objects to generate final geospatial data for the geographical region, as described above.

As further shown in FIG. 8, process 800 may include converting the final geospatial data into a directed graph for the geographical region (block 830). For example, the device (e.g., using processor 520, memory 530, storage component 540, input component 550, output component 560, communication interface 570, and/or the like) may convert the final geospatial data into a directed graph for the geographical region, as described above.

As further shown in FIG. 8, process 800 may include receiving event data identifying an event and inaccessible roads, caused by the event, in the geographical region (block 840). For example, the device (e.g., using processor 520, memory 530, storage component 540, input component 550, output component 560, communication interface 570, and/or the like) may receive event data identifying an event and inaccessible roads, caused by the event, in the geographical region, as described above.

As further shown in FIG. 8, process 800 may include updating the directed graph for the geographical region based on the event data and to generate an updated directed graph (block 850). For example, the device (e.g., using processor 520, memory 530, storage component 540, input component 550, output component 560, communication interface 570, and/or the like) may update the directed graph for the geographical region based on the event data and to generate an updated directed graph, as described above.

As further shown in FIG. 8, process 800 may include receiving, from a client device of a user, location data identifying a location of the client device in a geographical region (block 860). For example, the device (e.g., using processor 520, memory 530, storage component 540, input component 550, output component 560, communication interface 570, and/or the like) may receive, from a client device of a user, location data identifying a location of the client device in a geographical region, as described above.

As further shown in FIG. 8, process 800 may include processing the updated directed graph and the location data, with a machine learning model, to identify one or more shelters associated with the location of the client device (block 870). For example, the device (e.g., using processor 520, memory 530, storage component 540, input component 550, output component 560, communication interface 570, and/or the like) may process the updated directed graph and the location data, with a machine learning model, to identify one or more shelters associated with the location of the client device, as described above.

As further shown in FIG. 8, process 800 may include performing one or more actions based on identifying the one or more shelters (block 880). For example, the device (e.g., using processor 520, memory 530, storage component 540, input component 550, output component 560, communication interface 570, and/or the like) may perform one or more actions based on identifying the one or more shelters, as described above.

Process 800 may include additional implementations, such as any single implementation or any combination of implementations described below and/or in connection with one or more other processes described elsewhere herein.

In a first implementation, the one or more instructions, that cause the one or more processors to perform the one or more actions, cause the one or more processors to one or more of: provide, to the client device, information identifying the one or more shelters; determine navigation directions to the one or more shelters; provide, to the client device, navigation directions to the one or more shelters; cause emergency services personnel or an autonomous vehicle to be dispatched to the location of the client device; or retrain the machine learning model based on identifying the one or more shelters.

In a second implementation, alone or in combination with the first implementation, process 800 includes receiving, from the client device, a selection of a shelter from the one or more shelters; determining navigation directions to the shelter; and providing, to the client device, navigation directions to the shelter.

In a third implementation, alone or in combination with one or more of the first and second implementations, process 800 includes identifying a set of shelters based on proximity to the location of the client device; removing a first subset of shelters, from the set of shelters, that are associated with inaccessible roads; and removing a second subset of shelters, from the set of shelters, that are at capacity, wherein the one or more is sheltering correspond to shelters remaining in the set of shelters after removal of the first subset of shelters and the second subset shelters from the set of shelters.

In a fourth implementation, alone or in combination with one or more of the first through third implementations, process 800 includes receiving updated event data identifying updates to the event and the inaccessible roads in the geographical region; updating the updated directed graph for the geographical region based on the updated event data and to generate a further updated directed graph; and providing the further updated directed graph for display.

In a fifth implementation, alone or in combination with one or more of the first through fourth implementations, the road weight and type data includes data identifying: network strengths associated with the roads, primary roads of the roads in the geographical region, or secondary roads of the roads in the geographical region.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from one or more data sources, geospatial data identifying at least two of roads, buildings, or other objects of interest in a geographical region;
transforming, by the device, the geospatial data identifying the at least two of roads, buildings, or other objects of interest into corresponding geospatial objects;
correlating, by the device, destination data, that identifies destinations in the geographical region, with the geospatial objects to generate correlated data that includes the geospatial objects and the destination data;
processing, by the device, the correlated data to add bounding boxes around the geospatial objects corresponding to the destinations in the geographical region, to generate modified correlated data;
correlating, by the device, road weight and type data with the modified correlated data to generate final geospatial data for the geographical region;
converting, by the device, the final geospatial data into a directed graph for the geographical region;
receiving, by the device and from one or more data sources, event data identifying an event and inaccessible roads, caused by the event, in the geographical region;
updating, by the device, the directed graph for the geographical region based on the event data, to generate an updated directed graph; and
providing, by the device, a representation of the updated directed graph for display.

2. The method of claim 1, wherein each of the bounding boxes is defined by an area between two latitudinal lines and two longitudinal lines.

3. The method of claim 1, further comprising:
receiving updated event data identifying updates to the event and additional inaccessible roads in the geographical region;
updating the updated directed graph for the geographical region based on the updated event data and to generate a further updated directed graph; and
providing a representation of the further updated directed graph for display.

4. The method of claim 1, further comprising:
receiving, from a client device of a user, location data identifying a location of the client device in the geographical region;
processing the updated directed graph and the location data, with a machine learning model, to identify one or more destinations associated with the location of the client device; and
performing one or more actions based on identifying the one or more destinations.

5. The method of claim 4, further comprising:
receiving data identifying additional inaccessible roads in the geographical region;
updating the updated directed graph for the geographical region based on the data identifying the additional inaccessible roads and to generate a further updated directed graph;
processing the further updated directed graph and the location data to determine that there are no routes from the location of the client device to the destinations; and
causing emergency services personnel or an autonomous vehicle to be dispatched to the location of the client device.

6. The method of claim 5, further comprising:
providing, to the client device, a user interface that indicates there are no routes from the location to the destinations.

7. The method of claim 1, further comprising:
receiving, from a client device of a user, location data identifying a location of the client device in the geographical region;
processing the updated directed graph and the location data, with a machine learning model, to identify one or more destinations associated with the location of the client device; and
providing, to the client device, a user interface that includes a route from the location to one of the one or more destinations.

8. A device, comprising:
one or more memories; and
one or more processors, communicatively coupled to the one or more memories, configured to:
receive, from one or more data sources, geospatial data identifying roads and buildings in a geographical region;
transform the geospatial data identifying the roads and the buildings into geospatial objects that correspond to the roads and the buildings;
correlate shelter data that identifies shelters in the geographical region with the geospatial objects to generate correlated data that includes the geospatial objects and the shelter data;
process the correlated data to add bounding boxes around the geospatial objects corresponding to the shelters in the geographical region, to generate modified correlated data;
correlate road weight and type data with the modified correlated data to generate final geospatial data for the geographical region;
convert the final geospatial data into a directed graph for the geographical region;
receive, from one or more data sources, event data identifying an event and inaccessibility of roads, caused by the event, in the geographical region;
update the directed graph for the geographical region based on the event data and to generate an updated directed graph;
receive, from a client device of a user, location data identifying a location of the client device in the geographical region;
process the updated directed graph and the location data, with a machine learning model, to identify one or more shelters associated with the location of the client device; and
perform one or more actions based on identifying the one or more shelters.

9. The device of claim 8, wherein the one or more processors, when performing the one or more actions, are configured to one or more of:
provide, to the client device, information identifying the one or more shelters;
determine navigation directions to the one or more shelters; or
provide, to the client device, navigation directions to the one or more shelters.

10. The device of claim 8, wherein the one or more processors, when performing the one or more actions, are configured to:
  receive, from the client device, a selection of a shelter from the one or more shelters;
  determine navigation directions to the shelter; and
  provide, to the client device, navigation directions to the shelter.

11. The device of claim 8, wherein the one or more processors, when performing the one or more actions, are configured to one or more of:
  cause emergency services personnel or an autonomous vehicle to be dispatched to the location of the client device; or
  retrain the machine learning model based on identifying the one or more shelters.

12. The device of claim 8, wherein the one or more processors, when processing the updated directed graph and the location data, with the machine learning model, to identify the one or more shelters, are configured to:
  identify a set of shelters based on proximity to the location of the client device;
  remove a first subset of shelters, from the set of shelters, that are associated with inaccessible roads; and
  remove a second subset of shelters, from the set of shelters, that are at capacity,
    wherein the one or more shelters correspond to shelters remaining in the set of shelters after removal of the first subset of shelters and the second subset shelters from the set of shelters.

13. The device of claim 8, wherein the event includes one or more of:
  a natural disaster,
  a pandemic,
  a military conflict, or
  a terrorist act.

14. The device of claim 8, wherein the road weight and type data includes data identifying:
  network strength associated with the roads,
  primary roads of the roads in the geographical region, or
  secondary roads of the roads in the geographical region.

15. A non-transitory computer-readable medium storing instructions, the instructions comprising:
  one or more instructions that, when executed by one or more processors, cause the one or more processors to:
    transform geospatial data, identifying roads and buildings in a geographical region, into geospatial objects that correspond to the roads and the buildings;
    correlate shelter data that identifies shelters in the geographical region and road weight and type data with the geospatial objects to generate final geospatial data for the geographical region;
    convert the final geospatial data into a directed graph for the geographical region;
    receive event data identifying an event and inaccessible roads, caused by the event, in the geographical region;
    update the directed graph for the geographical region based on the event data and to generate an updated directed graph;
    receive, from a client device of a user, location data identifying a location of the client device in a geographical region;
    process the updated directed graph and the location data, with a machine learning model, to identify one or more shelters associated with the location of the client device; and
    perform one or more actions based on identifying the one or more shelters.

16. The non-transitory computer-readable medium of claim 15, wherein the one or more instructions, that cause the one or more processors to perform the one or more actions, cause the one or more processors to one or more of:
  provide, to the client device, information identifying the one or more shelters;
  determine navigation directions to the one or more shelters;
  provide, to the client device, navigation directions to the one or more shelters;
  cause emergency services personnel or an autonomous vehicle to be dispatched to the location of the client device; or
  retrain the machine learning model based on identifying the one or more shelters.

17. The non-transitory computer-readable medium of claim 15, wherein the one or more instructions, that cause the one or more processors to perform the one or more actions, cause the one or more processors to:
  receive, from the client device, a selection of a shelter from the one or more shelters;
  determine navigation directions to the shelter; and
  provide, to the client device, navigation directions to the shelter.

18. The non-transitory computer-readable medium of claim 15, wherein the one or more instructions, that cause the one or more processors to process the updated directed graph and the location data, with the machine learning model, to identify the one or more shelters, cause the one or more processors to:
  identify a set of shelters based on proximity to the location of the client device;
  remove a first subset of shelters, from the set of shelters, that are associated with inaccessible roads; and
  remove a second subset of shelters, from the set of shelters, that are at capacity,
    wherein the one or more shelters correspond to shelters remaining in the set of shelters after removal of the first subset of shelters and the second subset shelters from the set of shelters.

19. The non-transitory computer-readable medium of claim 15, wherein the one or more instructions, when executed by the one or more processors, further cause the one or more processors to:
  receive updated event data identifying updates to the event and the inaccessible roads in the geographical region;
  update the updated directed graph for the geographical region based on the updated event data and to generate a further updated directed graph; and
  provide the further updated directed graph for display.

20. The non-transitory computer-readable medium of claim 15, wherein the road weight and type data includes data identifying:
  network strengths associated with the roads,
  primary roads of the roads in the geographical region, or
  secondary roads of the roads in the geographical region.

* * * * *